US008849072B2

(12) United States Patent
Montoya et al.

(10) Patent No.: US 8,849,072 B2
(45) Date of Patent: Sep. 30, 2014

(54) SURFACE PLASMON ENHANCED OPTICAL DEVICES FOR INTEGRATED PHOTONICS

(75) Inventors: Juan Montoya, Cambridge, MA (US); Mark G. Allen, Boston, MA (US); Joel M. Hensley, Chelmsford, MA (US); Krishnan R. Parameswaran, Tewksbury, MA (US); Rajeev Ram, Arlington, MA (US)

(73) Assignee: Physical Sciences, Inc., Andover, MA (US)

( * ) Notice: Subject to any disclaimer, the term of this patent is extended or adjusted under 35 U.S.C. 154(b) by 598 days.

(21) Appl. No.: 12/704,174

(22) Filed: Feb. 11, 2010

(65) Prior Publication Data

US 2010/0316327 A1   Dec. 16, 2010

Related U.S. Application Data

(60) Provisional application No. 61/152,377, filed on Feb. 13, 2009.

(51) Int. Cl.
| | |
|---|---|
| *G02F 1/295* | (2006.01) |
| *G02B 6/12* | (2006.01) |
| *G02B 6/02* | (2006.01) |
| *G02B 6/122* | (2006.01) |
| *G02F 1/095* | (2006.01) |
| *G02F 1/01* | (2006.01) |
| *B82Y 20/00* | (2011.01) |

(52) U.S. Cl.
CPC ............ *G02B 6/1226* (2013.01); *G02F 1/0955* (2013.01); *G02F 1/011* (2013.01); *G02B 2006/12097* (2013.01); *G02F 2203/10* (2013.01); *B82Y 20/00* (2013.01)
USPC ............... 385/6; 385/14; 385/130; 427/163.2

(58) Field of Classification Search
None
See application file for complete search history.

(56) References Cited

U.S. PATENT DOCUMENTS

| 5,067,788 A  * | 11/1991 | Jannson et al. ................... 385/2 |
| 5,327,225 A  * | 7/1994  | Bender et al. ................. 356/445 |
| 2005/0063644 A1 | 3/2005 | Park et al. |
| 2009/0021727 A1* | 1/2009 | Sepulveda Martinez et al. ............................. 356/128 |

FOREIGN PATENT DOCUMENTS

WO   2005/052557   6/2005

OTHER PUBLICATIONS

Partial International Search Report for PCT/US10/23884. Jun. 17, 2010, 11 pages.
Chau, et al., "A Gigahertz Surface Magneto-Plasmon Optical Modulator," IEEE Journal of Quantum Electronics, vol. 40, No. 5, May 2004, pp. 571-579.
Ditlbacher, et al., "Coupling Dielectric Waveguide Modes to Surface Plasmon Polaritons," Optics Express, vol. 16, No. 14, Jul. 7, 2008 pp. 10455-10464.

(Continued)

*Primary Examiner* — Sarah Hahm
(74) *Attorney, Agent, or Firm* — Proskauer Rose LLP

(57) ABSTRACT

An optical device for integrated photonic applications includes a substrate, a dielectric waveguide and a surface plasmon waveguide. The dielectric waveguide includes a dielectric waveguide core disposed relative to a dielectric waveguide cladding and a common cladding. The surface plasmon waveguide includes a surface plasmon waveguide core disposed relative to the common cladding and a surface plasmon waveguide cladding. The common cladding couples the dielectric waveguide and the surface plasmon waveguide.

15 Claims, 28 Drawing Sheets

(56) References Cited

OTHER PUBLICATIONS

Guo, et al., "Faraday Rotation in Magneto-optical Semiconductor Waveguides for Integrated Isolators," Proc. of SPIE, vol. 6124, 2006, pp. 1-7.

Jung, et al., "Integrated Optics Waveguide Modulator Based on Surface Plasmon Resonance," Journal of Lightwave Technology, vol. 12, No. 10, Oct. 1994, pp. 1802-1806.

Khurgin, Jacob B., "Optical Isolating Action in Surface Plasmon Polaritons," Applied Physics Letters 89, American Institute of Physics, Dec. 20, 2006, pp. 1-3.

Liu, et al., "Coupling Between Long Range Surface Plasmon Polariton Mode and Dielectric Waveguide Mode," Applied Physics Letters 90, American Institute of Physics, Apr. 3, 2007, pp. 1-3.

Montoya, et al., "Surface Plasmon Enhanced Magneto-Optic Isolator," Laser and Electo-Optics 2009, CLEO/QELS 2009, Jun. 2, 2009, pp. 1-2.

Newman, et al., "The Magnetic Manipulation of Surface Plasmons—Consideration of Possible Technologies," PIERS Proceedings, Jul. 2008, pp. 486-489.

Nikolajsen et al., "Surface Plasmon Polariton Based Modulators and Switches Operating at Telecom Wavelengths," Applied Physics Letters, vol. 85, No. 24, American Institute of Physics, Dec. 13, 2004, pp. 5833-5835.

Richards, Caryl, "Surface Plasmon Polaritons Get Active," Optics and Laser Europe Magazine http://optics.org/cws/article/resarch/37580, Jan. 29, 2009, pp. 1-2.

Sepúlveda, et al., "Magnetooptic Effects in Surface-Plasmon-Polaritons Slab Waveguides," Journal of Lightwave Technology IEE USA, vol. 24, No. 2, Feb. 2006, pp. 945-955.

Shima, et al., "Magnetic Properties of Chromium Oxide and Iron Oxide Films Produced by Pulsed Laser Deposition," Journal of Applied Physics, vol. 91, No. 10, American Institute of Physics, May, 2002, pp. 7920-7922.

Sletten, et al., "Experimental Investigation of a Thin-Film Surface Polariton Polarizer," Journal of Applied Physics, American Institute of Physics, Jul. 1991, pp. 574-579.

Tepper, et al., "Magneto-optical Properties of Iron Oxide Films," Journal of Applied Physics, vol. 93, No. 10, American Institute of Physics, May 2003, pp. 6948-6950.

Tepper, et al., "Microstructure and Optical Properties of Pulsed-Laser-Deposited Iron Oxide Films," IEEE Transactions on Magnetics, vol. 40, No. 3, May 2004, pp. 1685-1690.

Tepper, et al., "Pulsed Laser Deposition of Iron Oxide Films," Journal of Applied Physics, vol. 91, No. 7, American Institute of Physics, Apr. 2002, pp. 4453-4456.

Wang, et al., "Optimal Design Method of a Low-Loss Broadband Y Branch with a Multimode Waveguide Section," Applied Optics, vol. 41, No. 36, Dec. 2002, pp. 7644-7649.

Yokoi, et al., "Demonstration of an Optical Isolator by Use of a Nonreciprocal Phase Shift," Applied Optics, vol. 38, No. 36, Dec. 1999, pp. 7409-7413.

Zaman, et al., "Faraday Rotation in an InP Waveguide," Applied Physics Letters 90, American Institute of Physics, May 2007, pp. 1-3.

\* cited by examiner

NONLINEAR FREQUENCY CONVERTER DESIGN PROCEDURE

DESIGN THE SURFACE-PLASMON WAVEGUIDE FOR THE FUNDAMENTAL WAVELENGTH. EVALUATE THE EFFECTIVE INDEX OF THE SURFACE-PLASMON WAVEGUIDE FOR THE INTERACTING WAVELENGTHS ($n_{eff}(\lambda_1)$, $n_{eff}(\lambda_2)$, $n_{eff}(\lambda_3)$) FOR A SECOND ORDER PROCESS OR ($n_{eff}(\lambda_1)$, $n_{eff}(\lambda_2)$, $n_{eff}(\lambda_3)$, $n_{eff}(\lambda_4)$) FOR A THIRD ORDER PROCESS. /105

ADD A METAL RIDGE OF HEIGHT h, AND WIDTH w, CENTERED ON THE SURFACE-PLASMON WAVEGUIDE METAL CORE. ADJUST THE HEIGHT h AND THE WIDTH w TO PHASE MATCH THE NONLINEAR FREQUENCY CONVERSION FOR EXAMPLE, FOR SECOND HARMONIC GENERATION THE EFFECTIVE INDEX OF THE COMBINED STRUCTURE MUST SATISFY $n_{eff}(\lambda_1/2) = n_{eff}(\lambda_1)$. /106

DESIGN THE INPUT COUPLING SECTION FOR THE INPUT WAVELENGTH(s), AND THE OUTPUT COUPLING SECTION FOR THE FREQUENCY CONVERTED WAVELENGTH. GRATINGS OR PRISMS MAY BE USED TO COUPLE IN AND OUT OF THE WAVEGUIDES. /107

Fig. 20

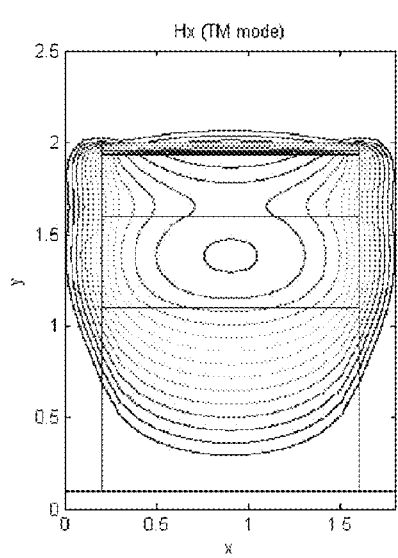 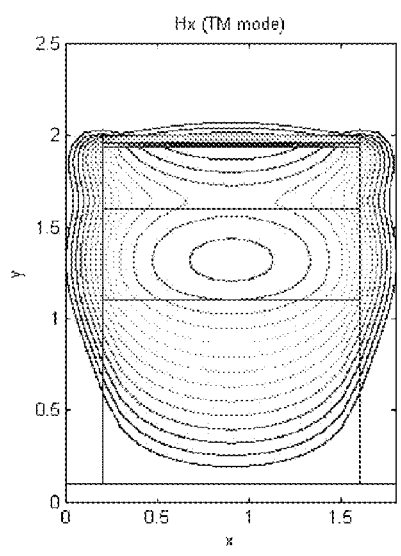
$n_{eff} = 3.3411 + .0473i$      $n_{eff} = 3.3033 + .0480i$
Fig. 27

SURFACE PLASMON ENHANCED OPTICAL DEVICES FOR INTEGRATED PHOTONICS

CROSS-REFERENCE TO RELATED APPLICATIONS

This application claims the benefit of and priority to U.S. provisional patent application No. 61/152,377 filed Feb. 13, 2009, which is owned by the assignee of the instant application and the disclosure of which is incorporated herein by reference in its entirety.

STATEMENT OF GOVERNMENT INTEREST

This invention was made with government support by the Defense Advanced Research Projects Agency and U.S. Army Aviation & Missile Command under Contract No. W31P4Q-08-C-0233 and Contract No. W31P4Q-09-C-0318. The Government has certain rights in the invention.

FIELD OF THE INVENTION

This invention relates generally to optical devices suitable for integrated photonic applications, and more particularly to surface plasmon enhanced optical devices.

BACKGROUND OF THE INVENTION

Integrated photonics offer the promise of combining many optical devices on a substrate, leading to miniaturization and increased functionality on a chip. Optical devices include but are not limited to optical isolators, frequency converters, amplitude or frequency modulators, couplers, splitters, and combiners. Integrated photonics can be formed from optical devices compatible with commonly used semiconductor fabrication techniques and materials and of a size scale suitable for dense integration.

An optical isolator is a nonreciprocal device that allows transmission of an optical wave in one direction but blocks it in the reverse direction. An optical isolator is analogous to a diode having a low electrical resistance between its input pod and output pod and a very high resistance between its output pod and its input pod, thereby permitting electrical current flow predominantly in one direction. Similarly, a light wave fed into the input pod of an optical isolator is guided with low loss to its output pod and any counter propagating light wave is attenuated so that only a minimal amount of power leaves the optical isolator via the input pod. A reciprocal device is symmetric upon interchange of the input and the output. In a nonreciprocal device, this interchange symmetry does not exist. Optical isolators can be used in optical systems since backscattered light creates noise and instability in laser sources, particularly in integrated platforms where the potential for backscattering increases with device density.

For bulk optical devices, a free-space optical isolator, also known as a bulk isolator, makes use of the Faraday effect, where a magneto-optic material produces a nonreciprocal polarization rotation to achieve isolation. An input field is transmitted through an input polarizer followed by a Faraday rotator, which provides a 45° polarization rotation to the incident beam, and finally an output polarizer oriented at 45° with respect to the input polarizer. In the forward direction, the field is completely transmitted as it is always polarized along the polarizer axes. In the reverse direction, the beam undergoes an additional 45° polarization rotation that is blocked by the input polarizer.

A dielectric waveguide incorporating the Faraday concept suitable for fabrication using semiconductor industry process steps can be made of a magnetically active material to achieve an integrated waveguide Faraday rotator.

A nonreciprocal phase shift isolator can make use of an interferometer arrangement. Both arms of the interferometer can contain a magneto-optic material with a magnetic field applied in a direction transverse to the propagation direction. In the forward direction, fields in both arms of the interferometer add constructively in phase. In the reverse direction, a nonreciprocal phase shift in one or both arms produces destructive interference and therefore isolation.

In a nonreciprocal loss isolator, a magneto-optic metal produces nonreciprocal loss in the optical wave. An active amplifying medium compensates for the loss in the forward direction. In the reverse direction, the nonreciprocity results in a larger loss resulting in isolation.

Surface plasmon waveguides have been suggested for use in a non-reciprocal phase shift interferometer arrangement. The magneto-optic metals (such as Co) and magneto-optic dielectrics (such as yttrium iron garnet (YIG) and bismuth iron garnet (BIG)), are not compatible with III-V optoelectronic devices and the processes for fabricating them.

An optical waveguide isolator based on a Y-shaped branching waveguide coupler is formed in one layer of a device made from III-V materials (such as GaAs or InP) with one isolating branch integrated with a III-V light emitting diode. With a 2° branching angle, a transmission in the forward direction of 41%, which corresponds to an insertion loss of approximately 3.8 dB, and a transmission in the backward or reverse direction of 0.16%, which corresponds to an isolation of approximately 28 dB, can be achieved. The isolator strength, defined as the ratio of insertion loss to isolation, can be 256. With a 3° branching angle and a cascade of four optical waveguide isolators, an isolator strength of 625 can result. Insertion loss is the loss experienced by an optical wave propagating through an optical isolator in forward direction.

A planar waveguide optical isolator comprising a Y-shaped combiner/splitter can include a planar waveguide N-way splitter/combiner. The forward directed signal is coupled into one of N−1 input waveguides, propagates through a coupling region, and is then coupled into the output waveguide. Reflected signals coupled into the output waveguide propagate through the coupling region and are split between each of the N−1 input waveguides. Except for the input waveguide, each of the N−1 branches is terminated with an isolating element to prevent further propagation of the reflected signal. The cascade arrangement of the waveguide branches is calculated to achieve the desired isolation. For a single stage isolator capable of achieving 3 dB isolation presuming a 50:50 split between the input port and a single reflecting port, a cascaded arrangement of ten such isolators is required to provide approximately 30 dB of isolation.

A single Y-shaped isolator structure can have a length on the order of 2.5 mm. As noted above, the Y-shaped approach can require a cascade of approximately ten isolators to achieve 30 dB isolation and can consequently require a much greater length.

An optical frequency converter is a device that takes an input field at one frequency and produces one or more output fields at one or more different frequencies. This process is therefore nonlinear, as new frequency components not present in the input field are created in the frequency converter. The efficiency of a nonlinear process requires phase matching between the interacting fields. Traditional methods for phase-matching include exploiting crystal birefringence by propagating waves along different axes of anisotropic crystals, periodically inverting crystal orientation to discretely reset the relative phase (so-called quasi-phase-matching (QPM)), or propagating waves in different waveguide modes to exploit waveguide dispersion. The birefringence method is limited to materials and wavelengths with specific properties, and not generally applicable to integrated photonic devices. QPM can be used in non-birefringent materials and, in waveguide geometries, permits conversion over indefinite propagation distances. QPM can equalize the phase velocity of waves of different frequencies propagating in a crystal by discretely inverting the crystal orientation along its length. Fabrication methods for QPM devices, however, require periodic patterning of crystal structures and have only been demonstrated for a small class of ferroelectric materials and semiconductors such as GaAs and ZnSe.

Amplitude modulation is a third important function in optical communications, where one signal (containing information) is transmitted by varying the strength of a second (carrier) signal. One example of a magneto-optic technique for achieving amplitude modulation uses the Faraday effect. An optical field is transmitted through an input polarizer then coupled to a magneto-optic waveguide followed by an output polarizer oriented at an angle with respect to the input polarizer. When a magnetic field is applied to the magneto-optic waveguide in a direction parallel to the propagation direction, the polarization of the optical field rotates. The output beam is therefore attenuated as it passes through the output polarizer. A similar approach for polarization rotation followed by polarization filtering can be accomplished using an electro-optic birefringent material (such as $LiNbO_3$, GaAs).

Interferometric modulators use an electro-optic material in the waveguide, where an electric field induces birefringence that produces a relative change in phase between the arms of the interferometer. When the optical fields in the interferometer arms are recombined, destructive interference occurs as a result of the induced phase shift.

Surface plasmon based modulators have been developed using interferometric configurations. In some cases, the dielectric material can include a thermo-optic polymer whose temperature rises when an electric signal is applied to the surface plasmon metal, resulting in a phase shift in the interferometer arm. The bandwidth in thermo-optic based devices can be low as a result of the slow heating process.

An electro-optic modulator can use a surface plasmon metal placed directly on top of a dielectric waveguide core material. The upper cladding of the surface plasmon waveguide can include an electro-optic material. An electric field causes the dielectric waveguide mode to be reflected or absorbed in the surface plasmon mode resulting in an amplitude modulation.

A magneto-optic surface plasmon modulator has been developed which works by applying a transverse magnetic field to a magneto-optic material bounded by a surface plasmon guiding metal. A free-space optical beam couples into the surface plasmon metal when the phase-matching condition is satisfied.

SUMMARY OF THE INVENTION

As the complexity of optical system increases, multiple optical functions, including but not limited to optical isolation, frequency conversion, and amplitude modulation, can be monolithically integrated onto a single material substrate to reduce the size and cost of the optical system. Lattice mismatch between semiconductors (such as InP and GaAs used in photonic chips) and magneto-optic materials (such as BIG and YIG) used in optical isolators and nonlinear materials (such as lithium niobate) used in frequency converters and amplitude modulators can be overcome.

Surface plasmon integrated circuits and devices offer several attractive features such as strong confinement of optical fields, the ability to simultaneously transport photonic and electronic signals, tolerance for sharp bending, and compatibility with existing semiconductor materials and manufacturing processes. Magneto-optic surface plasmon devices can exploit the ability to use the surface plasmon guiding metal as a current-carrying wire to generate magnetic fields that interact with the surface plasmon propagation characteristics. This current-induced localized magnetic field is well suited for optical devices such as high-bandwidth amplitude modulators and other optical devices such as optical isolators, frequency modulators, couplers, splitters, combiners and the like.

In some embodiments, the invention features an optical isolator device including a dielectric waveguide and a surface plasmon waveguide suitable for integrated photonic applications. The physics of the dielectric waveguide and the surface plasmon waveguide in proximity enables several optical device applications suitable for integrated photonics. A dielectric waveguide (for example, InP lower cladding, InGaAs core, and InP upper cladding) and a magneto-optic surface plasmon waveguide (for example, InP lower cladding, Fe core, and air upper cladding) can be separated by a common cladding material in an optical device. A common cladding can be a material layer serving as both the upper cladding of the dielectric waveguide and the lower cladding of the surface plasmon waveguide. In certain embodiments, a magneto-optic dielectric waveguide (for example, InP upper cladding, InGaAsP:Fe core, and InP lower cladding) and a non-magneto-optic surface plasmon waveguide (for example, InP lower cladding, Au core, and air upper cladding) can be combined. Device applications from this geometry include integrated optical isolators and amplitude modulators.

In one aspect, the invention features an optical device for integrated photonic applications. The optical device includes a substrate, a dielectric waveguide comprising a dielectric waveguide core disposed relative to a dielectric waveguide cladding and a common cladding, and a surface plasmon waveguide comprising a surface plasmon waveguide core disposed relative to the common cladding and a surface plasmon waveguide cladding. The common cladding can couple the dielectric waveguide and the surface plasmon waveguide.

In another aspect, the invention features an optical device for integrated photonic applications. The optical device includes a substrate, a dielectric waveguide comprising a dielectric waveguide core disposed relative to a dielectric waveguide cladding and a common cladding, and a surface plasmon waveguide comprising a surface plasmon waveguide core disposed relative to the common cladding and an effective surface plasmon waveguide cladding. The common cladding couples the dielectric waveguide and the surface plasmon waveguide.

In still another aspect, the invention features a method for fabricating an optical device for integrated photonic applications. A dielectric waveguide is disposed on a substrate. The dielectric waveguide includes a dielectric waveguide core relative to a dielectric waveguide cladding and a common cladding. A surface plasmon waveguide is disposed on the dielectric waveguide. The surface plasmon waveguide includes a surface plasmon waveguide core between the common cladding and a surface plasmon waveguide cladding. The dielectric waveguide and the surface plasmon waveguide share the common cladding, and the dielectric waveguide and the surface plasmon waveguide are coupled.

In another aspect, the invention features a method of operating an optical device for integrated photonic applications. A dielectric waveguide and a surface plasmon waveguide are coupled on a substrate. A magnetic field is applied in a direction transverse to propagation to cause the effective index of the surface plasmon waveguide to be non-reciprocal.

In yet another aspect, the invention features a method for designing an optical device comprising a dielectric waveguide and a surface plasmon waveguide formed on a substrate for integrated photonic applications. The effective index of the dielectric waveguide is determined. The real part of the surface plasmon waveguide effective index in the reverse direction is designed to match the effective index of the dielectric waveguide. The length of the surface plasmon waveguide required to fully couple into the surface plasmon waveguide in the reverse direction is determined. The thickness of the common cladding necessary to avoid coupling into the surface plasmon waveguide in the forward direction is determined. The design allows to one to obtain a target low insertion loss and a large isolation.

In still another aspect, the invention features a method for designing an optical device comprising a dielectric waveguide and a surface plasmon waveguide formed on a nonlinear substrate for integrated photonics frequency conversion applications. The surface-plasmon core geometry is designed on a nonlinear optical material, and the surface-plasmon core geometry of length L includes a ridge on a surface-plasmon core to phase match the nonlinear frequency conversion.

In another aspect, the invention features a method for operating an optical device for integrated photonic applications. A dielectric waveguide and a surface plasmon waveguide are coupled on a substrate based on index matching where the surface-plasmon waveguide core is bounded by a cladding. A current is applied in the surface-plasmon waveguide core to change the effective index of the surface-plasmon waveguide resulting in amplitude modulation.

In other embodiments, any of the aspects above, or any apparatus, device or system or method, process or technique described herein, can include one or more of the following features.

In various embodiments, either the dielectric waveguide or the surface plasmon waveguide includes a magneto-optic material. In certain embodiments, the surface plasmon waveguide cladding includes a magneto-optic material. The surface plasmon waveguide core can include a non magneto-optic material. In some embodiments, the surface plasmon waveguide core includes a magneto-optic material. The surface plasmon waveguide core can include a layer of a magneto-optic material formed on a layer of a non magneto-optic material. The surface plasmon waveguide cladding can be an effective cladding layer defined by ambient air.

The effective index of the surface plasmon waveguide can be adapted to be non-reciprocal when receiving a magnetic field in a direction transverse to propagation. The optical device can be an optical isolator, frequency modulator, an amplitude modulator, a coupler, a splitter, or a combiner. In various embodiments, a portion of the dielectric waveguide cladding is the common cladding.

In certain embodiments, the surface plasmon waveguide core defines a ridge formed on a surface of the common cladding. A first grating can be formed on the surface of the common cladding at a first end of the ridge. A second grating can be formed on the surface of the common cladding at a second end of the ridge. A current source can be adapted to be in electrical communication with the surface plasmon waveguide core.

In one or more embodiments, the invention features a surface plasmon enhanced optical isolator for integrated photonics.

In one or more embodiments, the invention features a surface plasmon enhanced frequency converter for integrated photonics.

In one or more embodiments, the invention features a surface plasmon enhanced amplitude modulator for integrated photonics.

In one or more embodiments, the invention features methods for designing surface plasmon enhanced optical devices for integrated photonics.

In one or more embodiments, the invention features methods for fabricating surface plasmon enhanced optical devices for integrated photonics.

Other aspects and advantages of the invention will become apparent from the following drawings and description, all of which illustrate principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 20 is a design procedure for a surface plasmon enhanced optical device for a frequency converter.

FIG. 27 illustrates two supermodes indicating coupling between a plasmon mode and a dielectric waveguide for a common cladding thickness of 350 nm.

DESCRIPTION OF THE INVENTION

Figure 1:
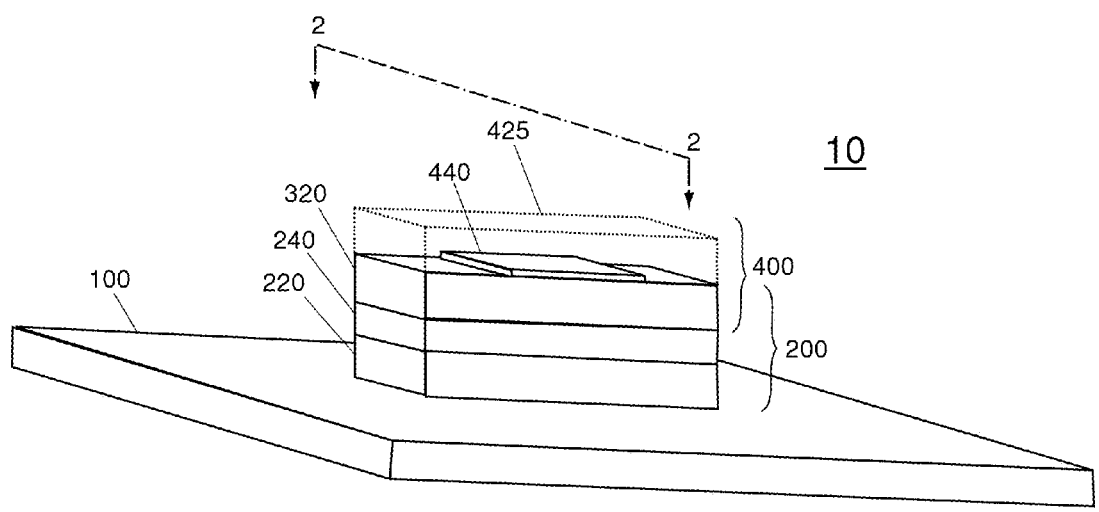
FIG. 1 is an isometric view of an embodiment of a surface plasmon enhanced optical device.
Figure 2:
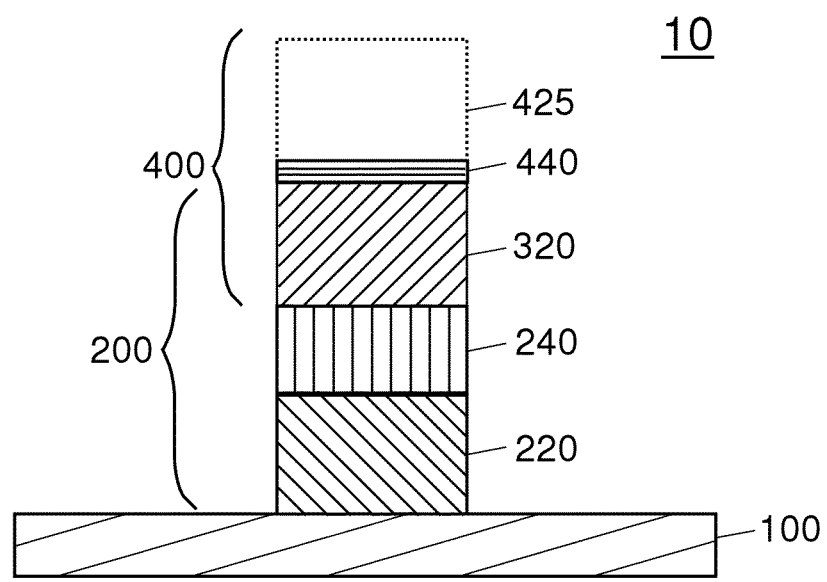
FIG. 2 is a cross-sectional view of the surface plasmon enhanced optical device depicted in FIG. 1.

FIG. 1 shows an optical device 10, e.g., an isolator, fabricated on substrate 100 and exploits a nonreciprocal coupling from a dielectric waveguide 200 into a surface plasmon waveguide 400 to achieve large isolation in the reverse direction and low insertion loss in the forward direction. FIG. 2 depicts the optical device 10 in cross sectional view with the ridge width. The two waveguides are designed to share a common cladding 320. The dielectric waveguide 200 includes three dielectric layers referred to as dielectric waveguide cladding 220, dielectric waveguide core 240, and the common cladding 320. The surface plasmon waveguide 400 includes three layers referred to as effective surface plasmon cladding 425, surface plasmon core 440, and the common cladding 320.

The optical device 10 is compatible with fabrication techniques developed for the semiconductor industry on substrate 100. In various embodiments, substrate 100 can be InP, GaAs, Si, GaSb, GaN, or other like materials. The dielectric waveguide 200 can include combinations of any of the substrate materials or other like materials. One or more of the cladding materials can include a Group III-V semiconductor material or a Group II-IV semiconductor material. A cladding material can include, for example, InP, GaAs, GaSb, GaN, Si, SiO$_2$, or SiN.

An effective surface plasmon cladding 425 can be the surrounding environment (for example, air or the ambient atmosphere) to distinguish it from a deposited material. The common cladding 320 serves as the cladding layer of the dielectric waveguide 200 and the cladding layer of the surface plasmon waveguide 400. The proximate relationship of the dielectric waveguide 200 and surface plasmon waveguide 400 can be exploited to facilitate coupling leading to nonreciprocal behavior.

The surface plasmon core 440 can include a non magneto-optic material (for example Au, Ag, or any other non magneto-optic metal), or can include a magneto-optic material such as iron, nickel, cobalt, or a magneto-optic alloy. The surface plasmon core 440 can be bi-metallic.

Figure 26:
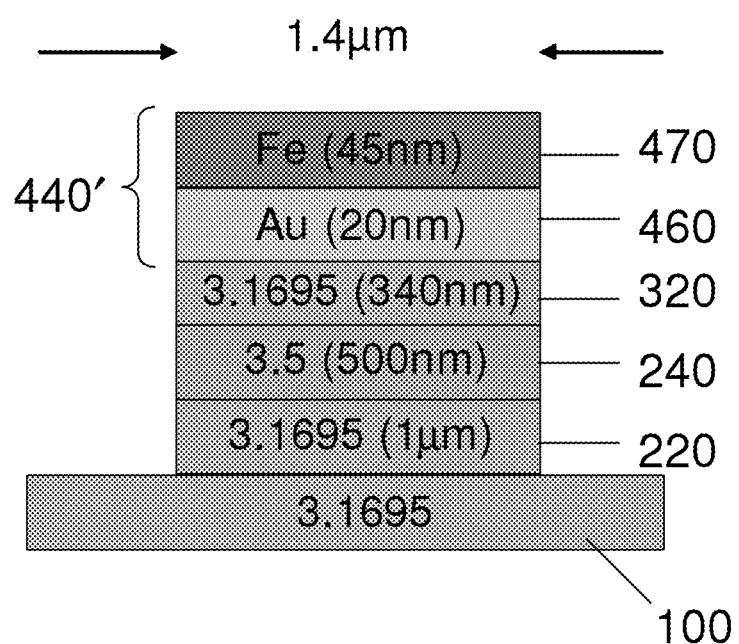
FIG. 26 shows a surface plasmon enhanced optical device including a multilayer surface plasmon waveguide core.
Figure 28A:
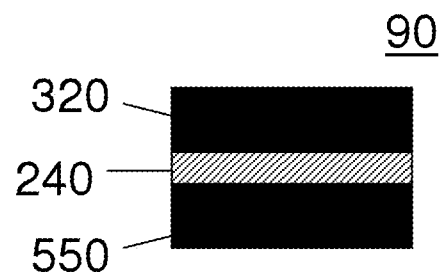
FIG. 28 shows a fabrication process for a surface plasmon enhanced optical device.
Figure 28B:
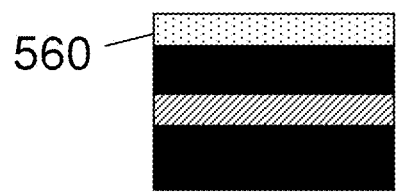
Figure 28C:
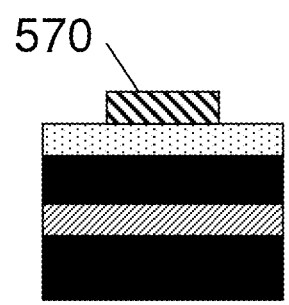
Figure 28D:
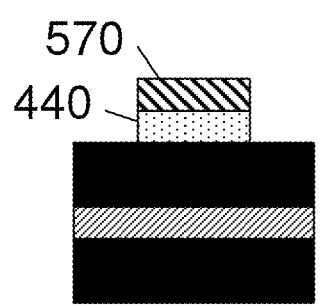
Figure 28E:
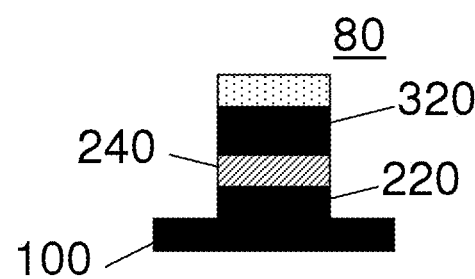

In various embodiments, the surface plasmon core 440 includes a first layer of a non magneto-optic material and a second layer of a magneto-optic material (see, e.g., FIG. 26). The second layer can be disposed or formed on the first layer, and the first layer can be disposed or formed on the common cladding. In certain embodiments, the non magneto-optic material is gold and the magneto-optic material is iron, although other materials can be used for either layer. In one detailed embodiment, the gold has a thickness of about 20 nm and the iron has a thickness of about 45 nm, although other dimensions can be used.

When an external magnetic field is applied to the metal in the direction transverse to propagation, the effective index of the surface plasmon waveguide 400 becomes different in the forward and reverse directions, thereby resulting in nonreciprocal behavior. In the reverse direction, the effective indices of the surface plasmon waveguide 400 and the dielectric waveguide 200 are matched and strong coupling occurs. In the forward direction, the indices of the dielectric waveguide 200 and the surface plasmon waveguide 400 are different and minimal coupling occurs as a result of the phase mismatch.

Figure 3:
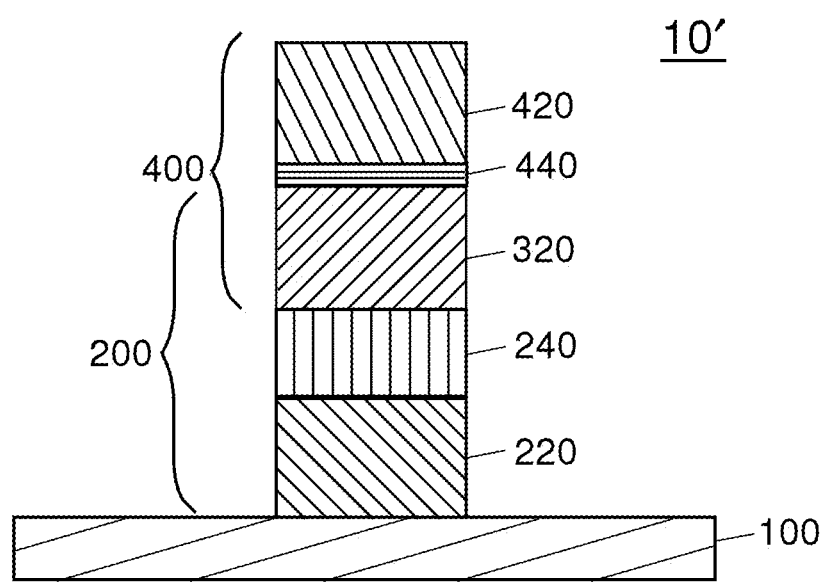
FIG. 3 is a cross-sectional view of another embodiment a surface plasmon enhanced optical device.

FIG. 3 shows an optical device 10' in sectional view including a surface plasmon cladding 420. In various embodiments, surface plasmon cladding 420 can be a magneto-optic dielectric material such as Fe: InP, BIG, or YIG, although surface plasmon cladding 420 can be a non magneto-optic dielectric material. When an external magnetic field is applied to the magneto-optic dielectric in the direction transverse to propagation, the effective index of the surface plasmon waveguide 400 becomes nonreciprocal (different in the forward and reverse directions). In the reverse direction, the effective indices of the surface plasmon waveguide 400 and the dielectric waveguide 200 are matched and strong coupling occurs. In the forward direction, the indices of the dielectric waveguide 200 and the surface plasmon waveguide 400 are different and minimal coupling occurs as a result of the phase mismatch.

Figure 4:
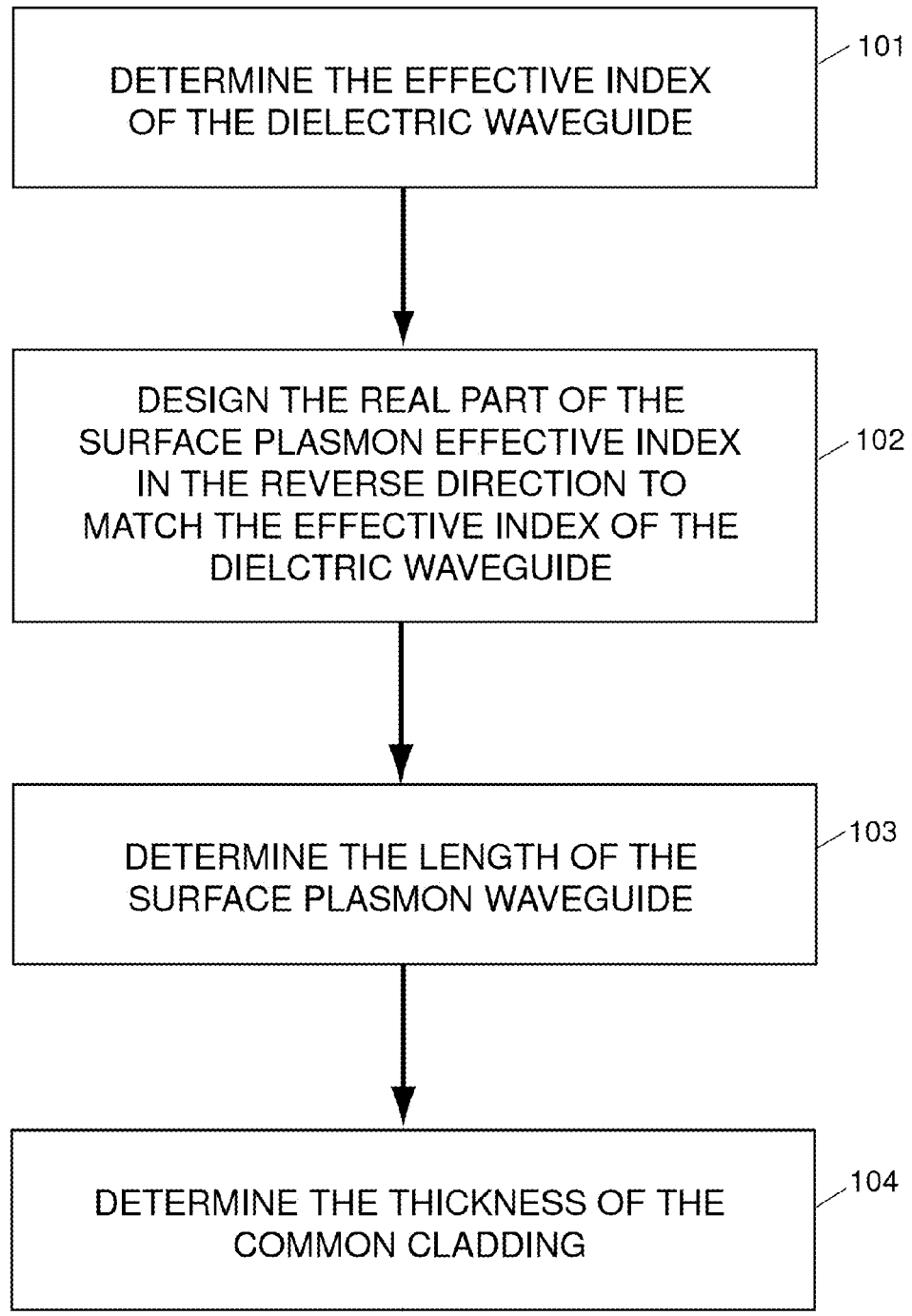
FIG. 4 is a design procedure for a surface plasmon enhanced optical device for an optical isolator.

FIG. 4 shows an exemplary design procedure for an optical isolator. The design procedure can be used for low loss surface plasmon modes. The decomposition of the optical isolator into an interaction between two isolated waveguide structures reveals the critical performance parameters, including the effective indices of the individual waveguides and the strength of coupling between them. In accordance with coupled-mode theory, coupling occurs when the real parts of their effective indices are matched.

To achieve optical isolation, the effective index of the surface plasmon waveguide matches that of the dielectric waveguide in the reverse propagation direction. In the forward direction, the effective indices differ to achieve low insertion loss. The nonreciprocity of the surface plasmon waveguide results from an external magnetic field applied in a direction transverse to that of the optical beam propagation in the magneto-optic metal (known as the Voigt geometry).

To achieve the desired performance of the optical isolator, the following parameters are varied during design; 1) the surface plasmon waveguide effective index, 2) the dielectric waveguide effective index, 3) the surface plasmon device length, and 4) the surface plasmon coupling coefficient. The procedure comprises the following steps:

Step 1 (101). Determine the effective index of the dielectric waveguide ($n_{eff dielectric}$) 200 using, e.g., a finite difference full vectorial magnetic field solver or other similar technique.

Step 2 (102). Evaluate the effective index of the surface plasmon waveguide 400 in the forward and reverse directions ($n_{eff,sp,fwd}$, $n_{eff,sp,rvs}$) by, e.g., solving Maxwell's equations. Design the surface plasmon waveguide 400 such that the real part of its effective index in the reverse direction matches the real part of the effective index of the dielectric waveguide 200 (Re{$n_{eff,sp,rvs}$}=Re{$n_{eff,dielectric}$}). The nominal surface plasmon waveguide effective index $n_{sp}$ is evaluated using the finite difference full vectorial magnetic field method (although other techniques can be used). The forward and reverse surface plasmon indices are determined by $nn_{eff,sp,fwd}=n_{sp}+\delta\beta/(2k_0)$ and $n_{eff,sp,rvs}=n_{sp}\delta\beta/(2k_0)$, where $\delta\beta$ is the detuning parameter induced by the externally applied magnetic field. $k_0$ is the propagation constant in free space ($k_0=2\pi/\lambda_0$), where $\lambda_0$ is the wavelength in free space.

Figure 5:
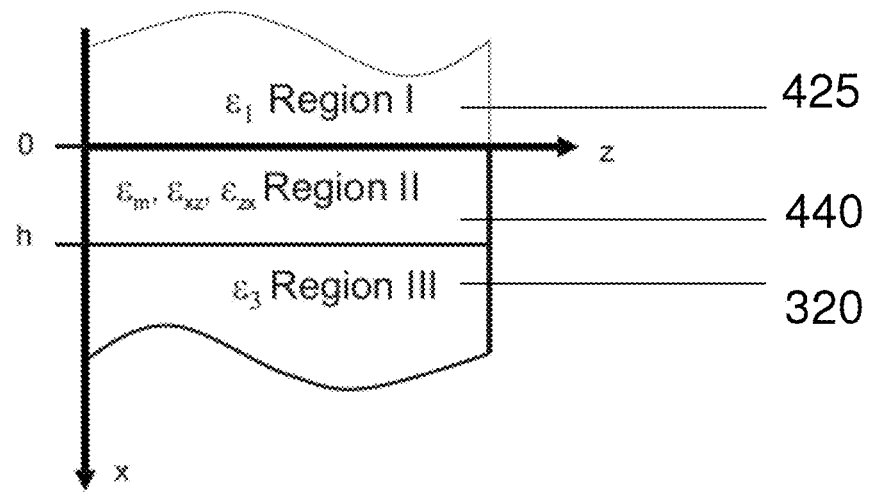
FIG. 5 illustrates the geometry used to calculate the non-reciprocal response of a dielectric waveguide and a magneto-optic metal.

The following is an example of how to solve for the detuning parameter. First, Maxwell's equations can be solved to calculate the effective indices and mode profiles for a simplified one-dimensional geometry. FIG. 5 shows a magneto-optic surface plasmon core (such as iron) in proximate relation with a dielectric waveguide (for example, an InP cladding, InGaAsP core, and InP common cladding). The design process can also be applied to a magneto-optic dielectric waveguide (such InP, InP:Fe, InP for the cladding, core, and upper cladding, respectively) and a non-magneto-optic surface plasmon waveguide (such as InP, Au, air for the common cladding, core, and effective cladding respectively). The common cladding can be magneto-optic, and the dielectric waveguide and surface plasmon waveguide core and cladding materials can be non-magneto-optic. The analysis for a magneto-optic surface plasmon waveguide core can be illustrated in proximate relation with a non-magneto-optic dielectric waveguide.

The dielectric properties of the magneto-optic metal can be described in terms of a permittivity tensor:

$$\varepsilon = \begin{bmatrix} \varepsilon_m & 0 & \varepsilon_{xz} \\ 0 & \varepsilon_m & 0 \\ \varepsilon_{zx} & 0 & \varepsilon_m \end{bmatrix} \quad (1)$$

where $\varepsilon_m$ is the permittivity of the metal in the absence of the magnetic field and the off-diagonal elements $\varepsilon_{xz}$, $\varepsilon_{zx}$ are complex quantities that are proportional to the externally applied magnetic field ($M_y$) in the direction transverse to propagation. To solve for the detuning parameter, the change in the propagation constant $\beta$ ($\beta=2\pi n/\lambda$) with a change in the direction of propagation is solved. Since reversing the magnetic field is equivalent to changing the direction of propagation, the detuning parameter can be defined in terms of $\beta(M_y)$ and $\beta(-M_y)$.

The change in the detuning parameter can be calculated as follows.

The magnetic fields are assumed to be of the form $H_y = f(x)e^{j(\omega t - \beta z)}$ for the geometry shown in FIG. 5, where:

$$f(x) = Ce^{S_1 x} \quad x<0 \text{ Region I} \quad (2)$$

$$f(x) = A\cos h(S_2 x) + B\sin h(S_2 x) \quad 0<x<h \text{ Region II} \quad (3)$$

$$f(x) = De^{-S_3(x-h)} \quad x>h \text{ Region III} \quad (4)$$

1. Implement the Boundary Conditions Between Regions (I) & (II)

Continuity of the tangential magnetic field ($H_y(x=0)$) requires that A=C. Continuity of the tangential electric field ($E_z(x=0)$), requires that:

$$E_z(0) = \frac{-j}{\omega\varepsilon_1}\frac{dH_y}{dx} = \frac{-jCS_1}{\omega\varepsilon_1} \quad (5)$$

Region II corresponding to the magneto-optic metal can be considered. Using the curl relationship of the magnetic field, the electric field can be expressed in terms of the magnetic field:

$$\nabla \times H = \begin{bmatrix} -\frac{\partial H_y}{\partial z} \\ 0 \\ \frac{\partial H_y}{\partial x} \end{bmatrix} = j\omega \begin{bmatrix} \varepsilon_m E_x + \varepsilon_{xz} E_z \\ \varepsilon_m E_y \\ \varepsilon_{zx} E_x + \varepsilon_m E_z \end{bmatrix} \quad (6)$$

Substituting equation (2) for the magnetic field in equation (6) and evaluating the result at x=0 results in equation (7):

$$\nabla \times H = \begin{bmatrix} j\beta A \\ 0 \\ BS_2 \end{bmatrix} = j\omega \begin{bmatrix} \varepsilon_m E_x + \varepsilon_{xz} E_z \\ 0 \\ \varepsilon_{zx} E_x + \varepsilon_m E_z \end{bmatrix} \quad (7)$$

This equation can be expressed in terms of $E_z$ and substitute equations (4) and (5) to solve for the amplitude constant B resulting in:

$$B = \frac{j\beta A\varepsilon_{zx} + [\varepsilon_m^2 - \varepsilon_{zx}\varepsilon_{xz}]\frac{S_1 A}{\varepsilon_1}}{S_2 \varepsilon_m} \quad (8)$$

2. Implement the Boundary Conditions Between Regions II & III

Starting with the curl relation of the magnetic field in the magneto-optic metal, superscript $E_z^{(2)}$ can be used to denote the electric field in region II:

$$\nabla \times H = \begin{bmatrix} -\frac{\partial H_y}{\partial z} \\ 0 \\ \frac{\partial H_y}{\partial x} \end{bmatrix} = j\omega \begin{bmatrix} \varepsilon_m E_x^{(2)} + \varepsilon_{xz} E_z^{(2)} \\ \varepsilon_m E_y \\ \varepsilon_{zx} E_x^{(2)} + \varepsilon_m E_z^{(2)} \end{bmatrix} \quad (9)$$

The magnetic field can be substituted for the metal region given by equation (2) into the left side of the curl relation in (9).

$$\begin{bmatrix} j\beta[A\cosh S_2 h + B\sinh S_2 h] \\ AS_2 \sinh S_2 h + BS_2 \cosh S_2 h \end{bmatrix} = j\omega \begin{bmatrix} \varepsilon_m E_x^{(2)} + \varepsilon_{xz} E_z^{(2)} \\ \varepsilon_{zx} E_x^{(2)} + \varepsilon_m E_z^{(2)} \end{bmatrix} \quad (10)$$

The two equations in (10) can be combined and solved for $E_z^{(2)}$:

$$[j\beta\varepsilon_{zx}A - \varepsilon_m BS_2]\cos hS_2 h + [j\beta\varepsilon_{zx}B - \varepsilon_m AS_2]\sin hS_2 h = [\varepsilon_{xz}\varepsilon_{zx} - \varepsilon_m^2]E_z^{(2)}j\omega \quad (11)$$

Next, the boundary conditions for the tangential magnetic field in region III are implemented. The tangential magnetic field $H_y^{(3)}(x=h)$ is found from setting equation (2) equal to (3) at the interface resulting in $H_y^{(3)}(x=h)=H_y^{(2)}(x=h)$:

$$D = [A\cos h(S_2 h) + B\sin h(S_2 h)] \quad (12)$$

The electric field in region III is then found by evaluating the curl relationship $E_z^{(3)} = 1/j\omega \cdot 1/\varepsilon_m \cdot d/dx\, H_y^{(3)}$ resulting in:

$$E_z^{(3)} j\varpi = \frac{-S_3}{\varepsilon_3}[A\cosh(S_2 h) + B\sinh(S_2 h)] \quad (13)$$

The last step involves implementing the boundary condition on the tangential electric field, which allows $E_z^{(3)}(x=h) = E_z^{(2)}(x=h)$ to be written. Substitution of equation (13) into equation (11) and some algebraic manipulation yields a transcendental equation:

$$\left\{B + \frac{[j\beta\varepsilon_{zx}B - \varepsilon_m AS_2]}{[\varepsilon_{xz}\varepsilon_{zx} - \varepsilon_m^2]\frac{S_3}{\varepsilon_3}}\right\}\tanh(S_2 h) + \left[\frac{j\beta\varepsilon_{zx}A - \varepsilon_m BS_2}{[\varepsilon_{xz}\varepsilon_{zx} - \varepsilon_m^2]\frac{S_3}{\varepsilon_3}} + A\right] = 0 \quad (14)$$

which can be solved along with the conservation of momentum equations:

$$S_1^2 = \beta^2 - k_o^2 \varepsilon_1$$
$$S_2^2 = \beta^2 - k_o^2 \varepsilon_m$$
$$S_3^2 = \beta^2 - k_o^2 \varepsilon_3 \quad (15)$$

Reversing the sign of the magnetic field is equivalent to reversing the direction of propagation. The sign of the magnetic field is taken into account in the off-diagonal terms of the permittivity tensor ($\varepsilon_{xz}$ and $\varepsilon_{zx}$) which are proportional to the magnetic field strength. Solving equations (14) and (15) for $\beta$ as a function of a positive magnetic field ($+M_y$) results in the forward propagation constant $\beta_F = \beta(+M_y)$. Solving equations (14) and (15) for a negative magnetic field results in the reverse propagation constant $\beta_R = \beta(-M_y)$. The detuning parameter is defined as $\delta\beta = \beta_F - \beta_R$. The detuning parameter can quantify mismatch.

Step 3 (103). Use coupled mode theory to determine the length of the surface plasmon waveguide 400 required to fully couple into it in the reverse direction for a coupling strength determined by the thickness of the common cladding 320 material. To apply coupled mode theory, the lossless approximation to determine the coupling coefficient can be used. For the lossless case, the coupling coefficient $\kappa_{12}$ from the dielectric waveguide to the surface plasmon waveguide is equivalent to the coupling coefficient $\kappa_{21}$ from the surface plasmon waveguide to the dielectric waveguide, so the subscripts are dropped and ($\kappa_{21} = \kappa_{12} = \kappa$). The coupling coefficient for the lossless case is given by:

$$\kappa = \frac{k_0^2}{2\beta_2} \frac{\int (\varepsilon_1 - \varepsilon_c) U_2^* U_1 dA}{\int |U_1|^2 dA} \quad (16)$$

where $\varepsilon_1$ is the permittivity of the core of the dielectric waveguide (e.g., InGaAsP), and $\varepsilon_c$ is the permittivity of the common cladding (e.g., InP). $U_2$ and $U_1$ are the unperturbed normalized cross-sectional magnetic field amplitudes of the modes in the surface plasmon waveguide and dielectric waveguide respectively, and $\beta_2$ is the real part of the propagation constant of the surface plasmon waveguide. For low loss surface-plasmon waveguides, the equivalent lossless surface plasmon structure may be used which includes an idealized core material that results in the same real effective index as the low-loss surface plasmon structure for the same cladding and common cladding. This approximate technique is valid for the small loss. For coupling into large loss surface-plasmon modes, the coupling coefficient can be determined using a full-vectorial finite difference magnetic field solver (or another technique) to solve for the supermodes of the dielectric waveguide and the lossy surface plasmon structure and their corresponding effective indices. The coupling coefficient is proportional to the difference in the supermode effective indices. For large loss surface-plasmon modes, the isolation and insertion loss may be determined from the supermode effective indices of the device, and by propagating the supermode solutions, for each value of the coupling coefficient.

Figure 9:
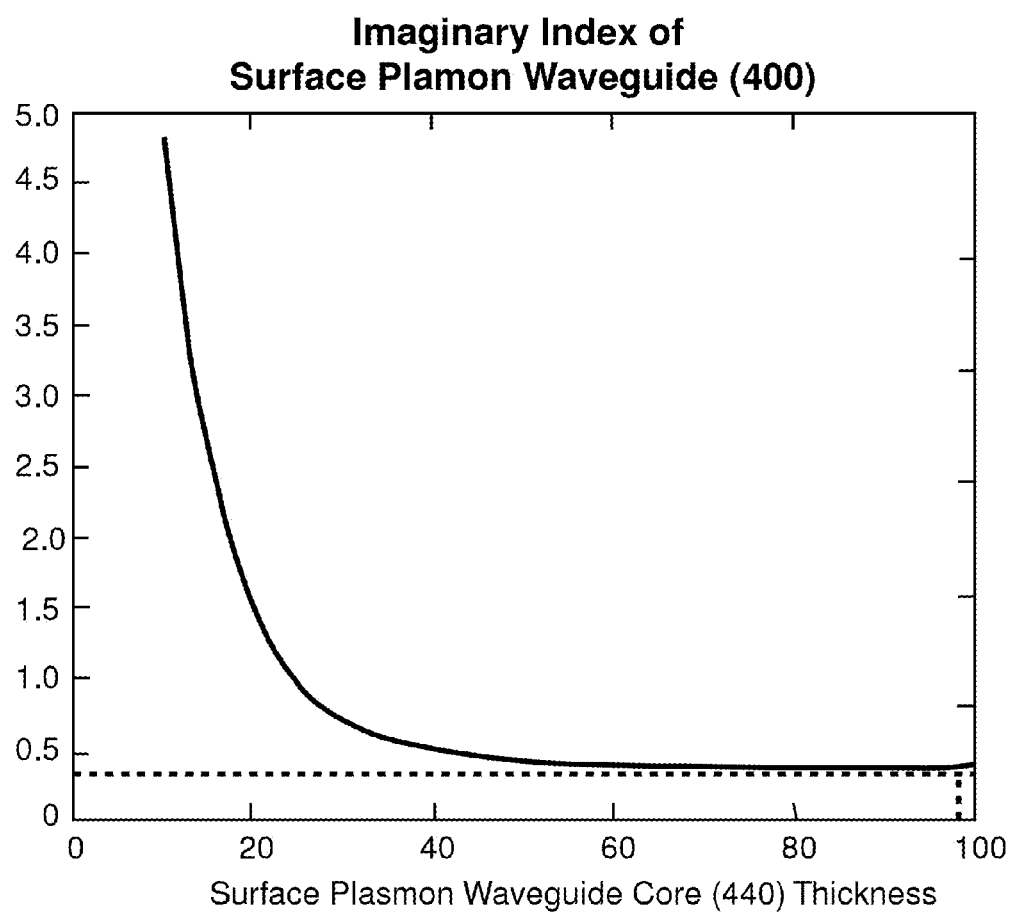
FIG. 9 illustrates the imaginary component of the effective index of the surface plasmon waveguide as a function of the thickness of the surface plasmon waveguide core.
Figure 10:
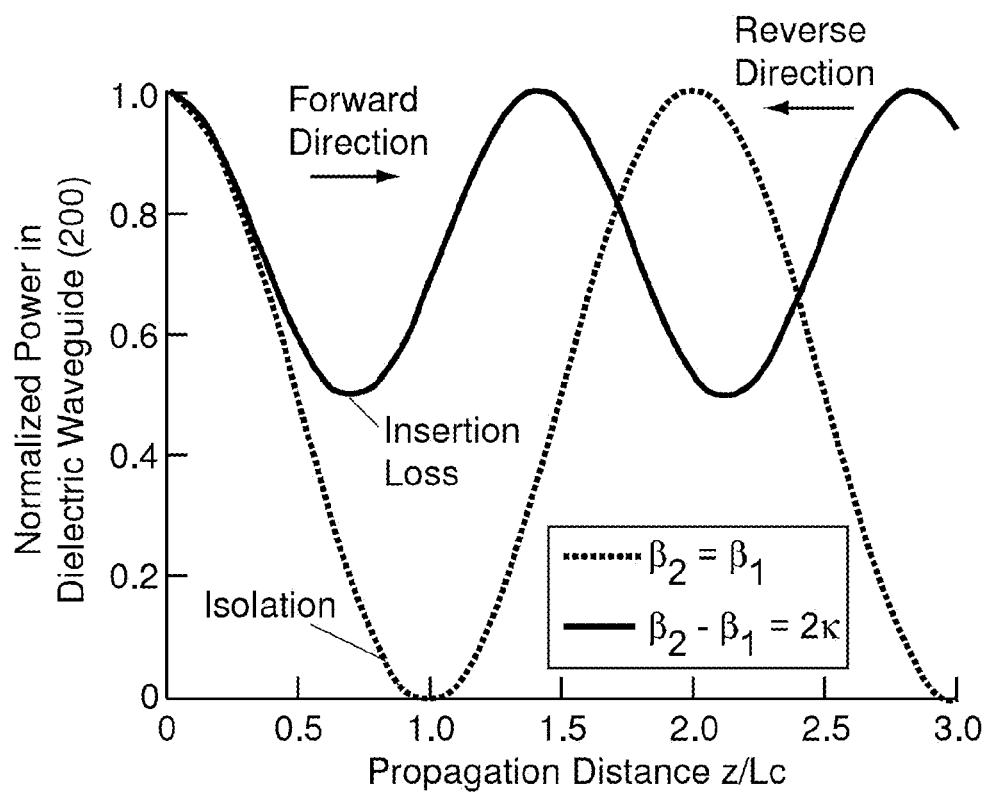
FIG. 10 illustrates the normalized power in the dielectric waveguide in the forward and reverse directions as a function of the propagation distance.

The loss for a low loss surface plasmon waveguide is taken into account by attenuating the lossless surface plasmon mode as power is transferred from the dielectric waveguide into the surface plasmon mode. A perturbative analysis of the loss is shown in FIGS. 9 and 10. These figures were generated by solving for the supermodes of an equivalent lossless surface plasmon waveguide having the same real-index as the lossy surface plasmon mode separated from a dielectric waveguide by a common cladding. Increasing the loss of the surface plasmon waveguide indicates that the power transferred to the surface plasmon mode undergoes attenuation while the coupling length remains fixed.

Step 4 (104). Choose the common cladding 320 thickness necessary to achieve a given insertion loss specification by evaluating the coupling into the surface plasmon waveguide 400 in the forward direction using coupled mode theory.

The design procedure described in FIG. 4 is applied to an embodiment of the optical isolator depicted in FIG. 2. The optical isolator is fabricated using commonly available semiconductor fabrication techniques. An input guided mode at 1550 nm propagates through a dielectric waveguide in the forward direction. The dielectric waveguide 200 can include an InP dielectric waveguide cladding 220, an InGaAsP dielectric waveguide core 240, and an InP common cladding 320 with an effective index $n_{eff,dielectric}$. The surface plasmon waveguide 400 can include an InP common cladding 320, a thin film magnetic metal (iron) surface plasmon waveguide core 440 and an air effective surface plasmon waveguide cladding 425 such that an applied external magnetic field produces a nonreciprocal effective index ($n_{eff,sp,fwd}$, $n_{eff,sp,rev}$) in the forward and reverse directions, respectively. In the forward direction, modes in the dielectric waveguide 200 and surface plasmon waveguide 400 are phase-mismatched ($n_{eff,dielectric} \neq n_{eff,sp,fwd}$) and no coupling occurs, resulting in a low insertion loss. In the reverse direction, the modes in the dielectric waveguide 200 and surface plasmon waveguide 400 are phase matched ($n_{eff,dielectric} = n_{eff,sp,rev}$) and coupling into the lossy-surface plasmon waveguide 400 results in large isolation.

The design procedure depicted in FIG. 4 is illustrated with representative parameter values below. The desired insertion loss is less than 3 dB, and the desired isolation is greater than 30 dB. The nominal device length is approximately 50 µm, and the nominal device width is approximately 1.4 µm. The dielectric waveguide cladding 220 has a nominal thickness of approximately 1 µm, the dielectric waveguide core 240 has a nominal thickness of approximately 0.5 µm, the common cladding 320 has a nominal thickness of 0.9 µm, and the surface plasmon waveguide core 440 has a nominal thickness of 0.1 µm.

In Step 1 of the design process shown in FIG. 4, the effective index of the dielectric waveguide ($n_{eff,dielectric}$) 200 is determined using a finite difference full vectorial magnetic field solver. One of ordinary skill in the art will recognize that other solver techniques can be used. The effective index of the dielectric waveguide 200 is varied by changing the ridge width, w.

Figure 6:
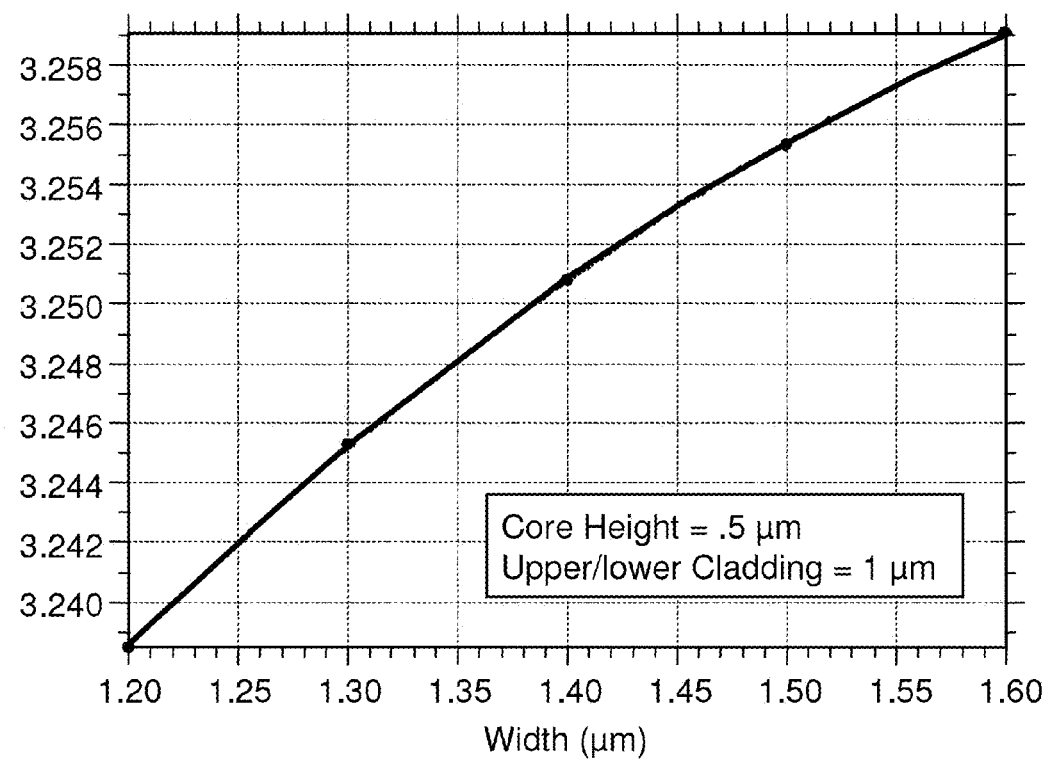
FIG. 6 illustrates the variation of the effective index in the dielectric waveguide as a function of width, w.

FIG. 6 illustrates the variation of the effective index in the dielectric waveguide 200 as a function of the width. Varying the effective index of the dielectric waveguide 200 by adjusting the ridge width and independently adjusting the surface plasmon waveguide core 440 thickness optimizes the structure for large isolation. Phase-matching the modes in the surface plasmon waveguide 400 and dielectric waveguide 200 in the reverse propagation direction is critical to achieving high isolation. Applying a magnetic field transverse to the direction of propagation detunes the dielectric waveguide 200 and surface plasmon waveguide 400 in the forward direction. Complete coupling from the dielectric waveguide 200 to the surface plasmon waveguide 400 in the phase-matched condition requires that the interaction length between the surface plasmon waveguide 400 and the dielectric waveguide 200 be equal or substantially equal to the coupling length ($L_c$). A nominal width of 1.4 µm is selected to match the effective indices of the surface plasmon waveguide 400 and dielectric waveguide 200 in the reverse direction.

In Step 2 of the design process shown in FIG. 4, the effective indices of the surface plasmon waveguide 400 in the forward and reverse direction ($n_{eff,sp,fwd}$, $n_{eff,sp,rvs}$) are evaluated by solving Maxwell's equations. The surface plasmon waveguide 400 is designed such that the real part of its modal effective index in the reverse direction matches that of the dielectric waveguide ($\mathrm{Re}\{n_{eff,sp,rvs}\}=\mathrm{Re}\{n_{eff,dielectric}\}$). The effective index of the dielectric waveguide 200 with width of 1.4 µm and length of 50 µm as determined in Step 1 and shown in FIG. 6 is $n_{eff,dielectric} \cong 3.25$.

Figure 7:
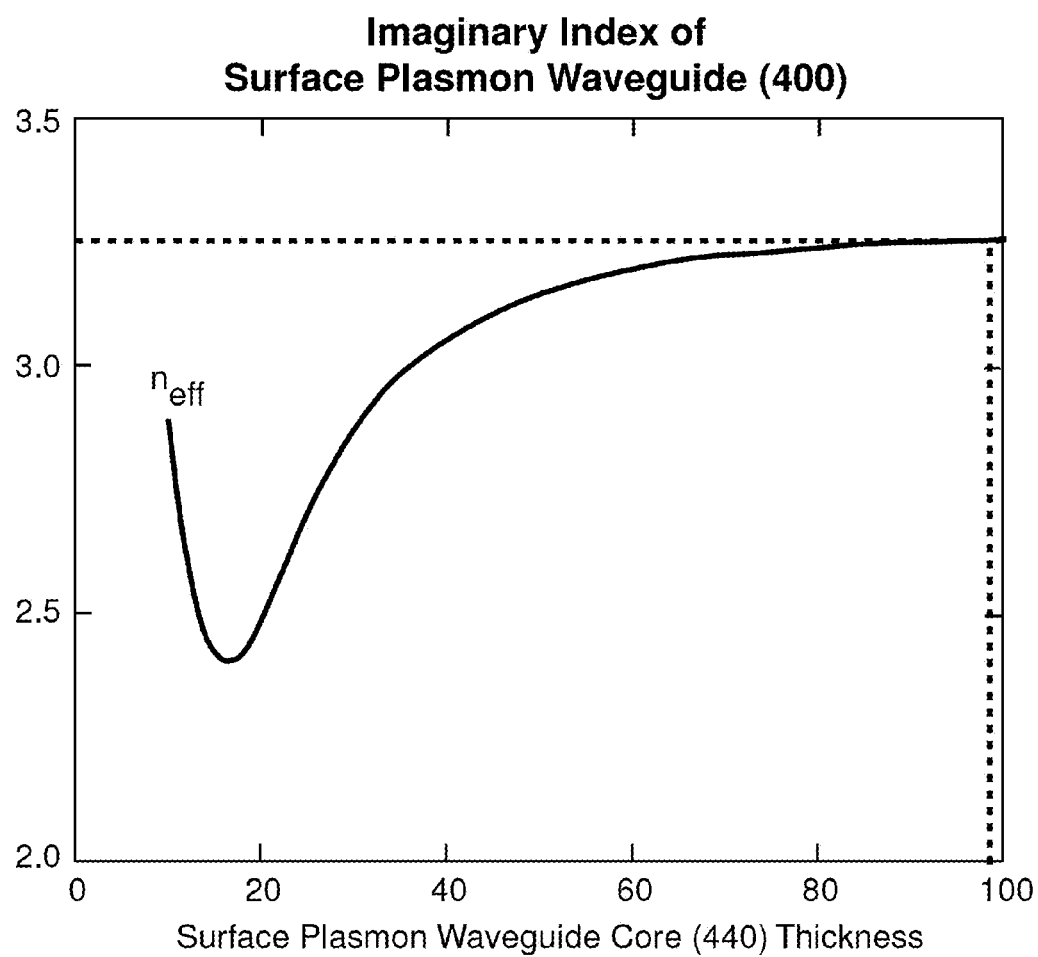
FIG. 7 illustrates the variation of the effective index in the surface plasmon waveguide as a function of thickness of the surface plasmon waveguide core.

A plot of the effective index for the surface plasmon waveguide 400 is shown in FIG. 7 as a function of surface plasmon waveguide core 440 iron film thickness. As illustrated in FIG. 7, a surface plasmon waveguide core 440 thickness of 100 nm produces the desired phase-matching ($n_{eff,dielectric}=n_{eff,sp,rvs}$).

Figure 8:
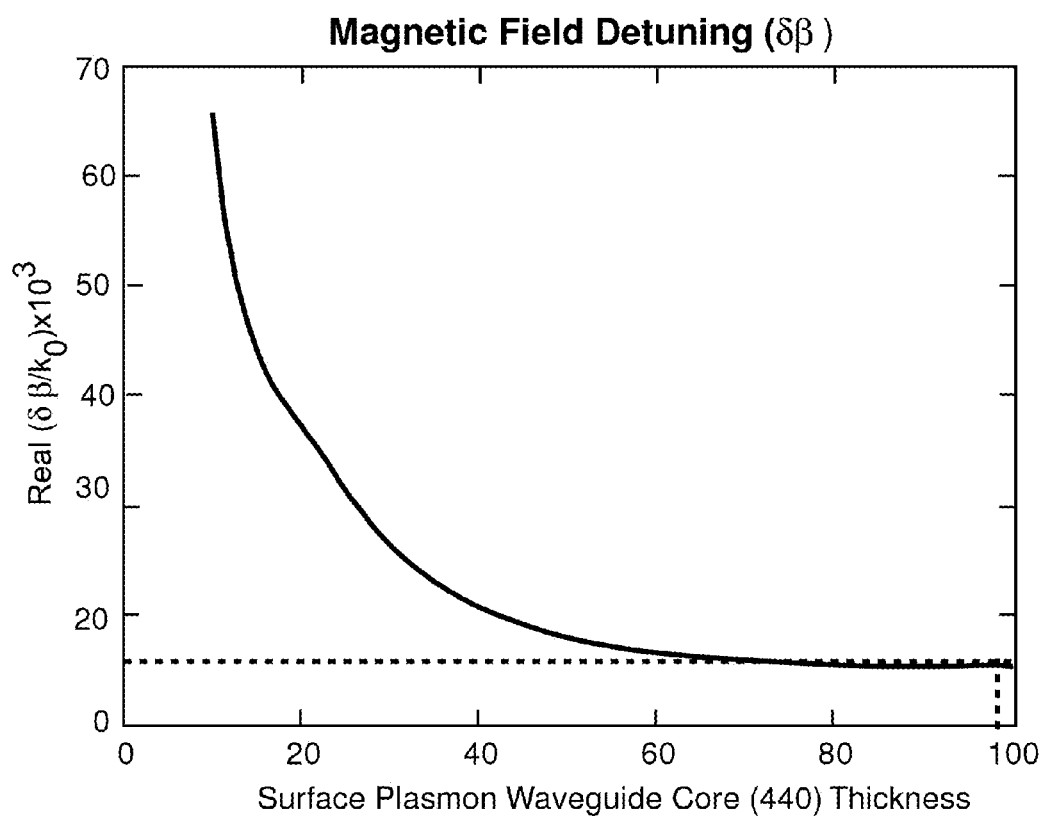
FIG. 8 illustrates the magnetic field detuning parameter as a function of thickness of the surface plasmon waveguide core.

The magnetic field detuning parameter $\delta\beta$ is shown in FIG. 8 for a saturated magnetic field of $B_{sat} \cong 0.17$ Tesla. The detuning changes the effective index of the surface plasmon mode such that ($n_{eff,sp,fwd}-n_{eff,sp,rvs}=\delta\beta/k_0$) where $k_0=2\pi/\lambda$ is the free-space propagation constant.

The plot of the imaginary part of the effective index of the surface plasmon waveguide 400 as a function of surface plasmon waveguide core 440 thickness shown in FIG. 9 illustrates that the mode undergoes attenuation during propagation and provides isolation in the reverse direction. This attenuation insures extinction of the mode that is coupled out of the dielectric waveguide 200 into the surface plasmon waveguide 400.

In Step 3 of the design process shown in FIG. 4, the length of the surface plasmon waveguide 400 required to fully couple from the dielectric waveguide into the surface plasmon waveguide 400 in the reverse direction for a coupling strength determined by the thickness of the common cladding 320 material is calculated. The role of the surface plasmon waveguide 400 length in determining the isolation and insertion loss is described herein.

If the surface plasmon length is smaller than the coupling length $L_c$, incomplete coupling from the dielectric waveguide mode into the surface plasmon mode occurs in the reverse direction. This effect is illustrated in FIG. 10 where the normalized power in the forward and reverse directions are plotted for the lossless surface plasmon case and where $\beta_2$ and $\beta_1$ are the propagation constants of the surface plasmon waveguide FIG. 10 and dielectric waveguide 200, respectively. In the reverse direction, $\beta_2=\beta_1$, and strong coupling into the surface plasmon waveguide 400 occurs resulting in large isolation. In the forward direction $\beta_2 \neq \beta_1$, and phase mismatch results in lower insertion loss.

Figure 11:
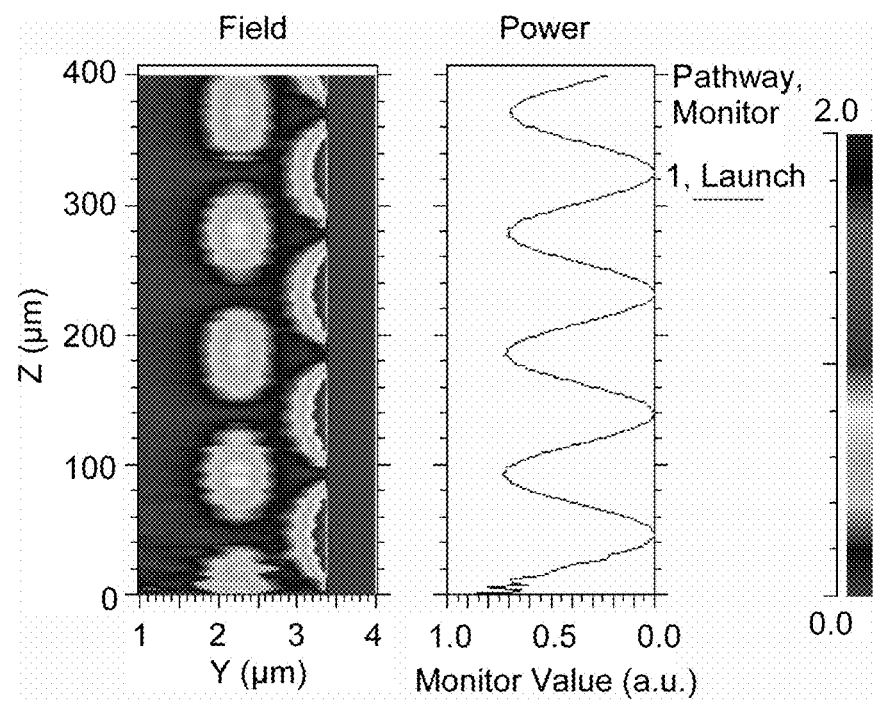
FIG. 11 illustrates the normalized power for a lossless surface plasmon waveguide.
Figure 12:
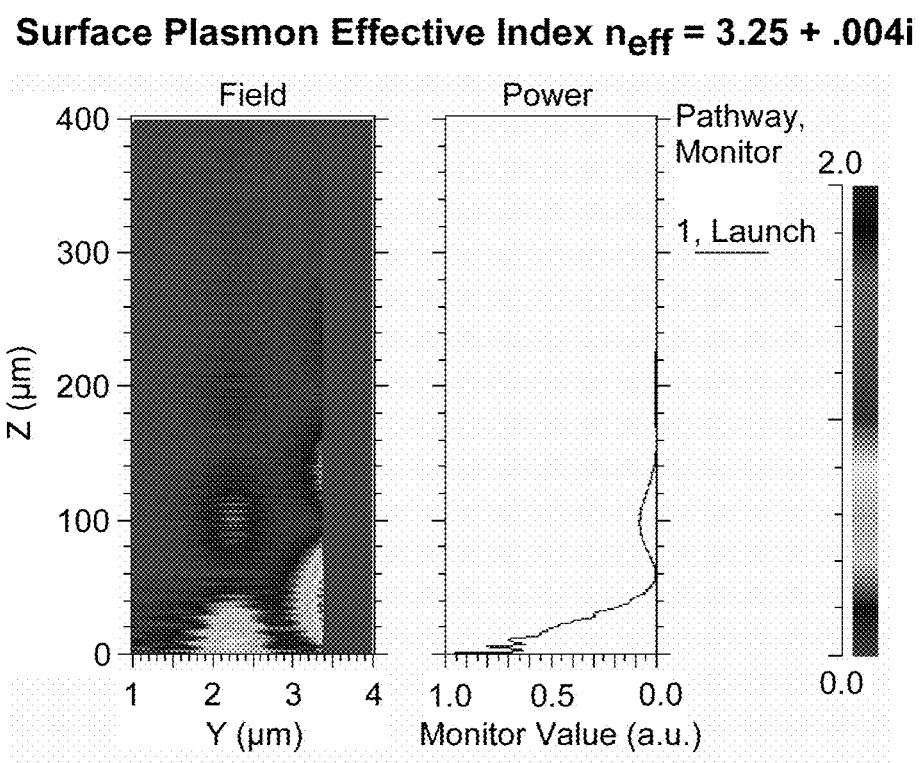
FIG. 12 illustrates the normalized power for a lossy surface plasmon waveguide.

The lossless case illustrated in FIG. 10 suggests that the power can oscillate back and forth between the surface plasmon waveguide 400 and the dielectric waveguide 200. However, loss in the surface plasmon waveguide 400 results in power absorption in the surface plasmon waveguide FIG. 10 and decreased power transferred back into the dielectric waveguide 200. Simulation results for the lossless surface plasmon waveguide 400 case are presented in FIG. 11 and results for the lossy surface plasmon waveguide 400 case are presented in FIG. 12.

The coupling length ($L_c$=50 µm) remains fixed as the loss is increased while the number of oscillations of power transfer decreases as the surface plasmon waveguide 400 absorbs the power. The simulations suggest that the design is robust to fabrication errors in the exact device length, because lengths of the surface plasmon waveguide core 440 metal film that are larger than the coupling length can still achieve the target isolation. Furthermore, in the forward direction the insertion loss is not highly sensitive to the device length since the dielectric mode has a small evanescent tail extending into the surface plasmon waveguide core 440 metal and a large phase mismatch prevents coupling. The large phase mismatch in the forward direction is a result of the detuning created by the externally applied magnetic field.

The surface plasmon waveguide 400 length can be varied in the mask designs in order to optimize the coupling from the dielectric mode into the surface plasmon mode in the reverse propagation direction. A nominal coupling length of 50 µm is expected from the simulation results. This length is an order of magnitude smaller than that of existing devices and is thereby favorable for dense integration.

In Step 4 of the design process shown in FIG. 4, the common cladding 320 material thickness necessary to achieve a given insertion loss specification is determined by evaluating the coupling into the device in the forward direction using coupled mode theory. More specifically, the surface plasmon coupling coefficient is optimized by varying the common cladding 320 thickness. The coupling coefficient is a critical parameter in the nonreciprocal optical isolator as it determines the insertion loss and the coupling length.

The coupling length required to achieve isolation is inversely proportional to the coupling coefficient κ, as expressed in Eq. (17). In principle, the coupling length can be decreased from the nominal 50 µm design value. However, the coupling coefficient and coupling length are constrained to satisfy the 3 dB insertion loss requirement.

$$L_c = \frac{\pi}{2\kappa} \qquad (17)$$

The insertion loss is defined in terms of the transmission coefficient between any two points on a device. For the nonreciprocal optical coupling isolator, the insertion loss in dB can be expressed as:

$$IL = -10\log_{10}\left(1 - \frac{\kappa^2}{\left(\frac{\beta_1 - \beta_{2F}}{2}\right)^2 + \kappa^2}\right) \qquad (18)$$

Figure 13:
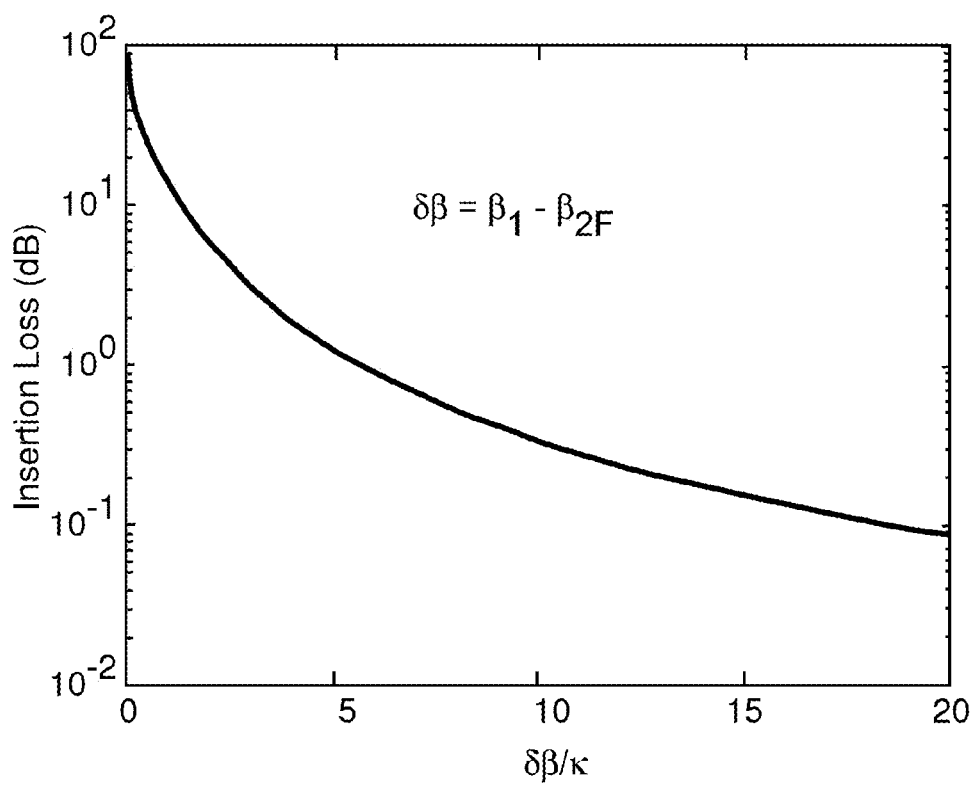
FIG. 13 illustrates the insertion loss as a function of the detuning parameter.

In evaluating Eq. (2), it is convenient to define a detuning parameter ($\delta\beta=\beta_1-\beta_{2F}$) to measure the phase mismatch between the dielectric waveguide 200 and the surface plasmon waveguide 400. The 3 dB insertion loss occurs at the half power point where the detuning parameter $\delta\beta=2\kappa$. A plot showing the insertion loss in decibels as a function of the detuning parameter is shown in FIG. 13. The source of the detuning is the nonreciprocal change in the propagation constant of the magneto-optic surface plasmon waveguide 400 with an externally applied magnetic field. By increasing the separation between the dielectric waveguide 200 and surface plasmon waveguide 400, the coupling strength $\kappa$ decreases and the ratio of $\delta\beta/\kappa$ increases. This weaker coupling results in a smaller insertion loss. As the detuning parameter is increased, the insertion loss also decreases. This reflects the inefficient coupling between the dielectric waveguide 200 and surface plasmon waveguide 400 as the phase mismatch increases.

Figure 14:
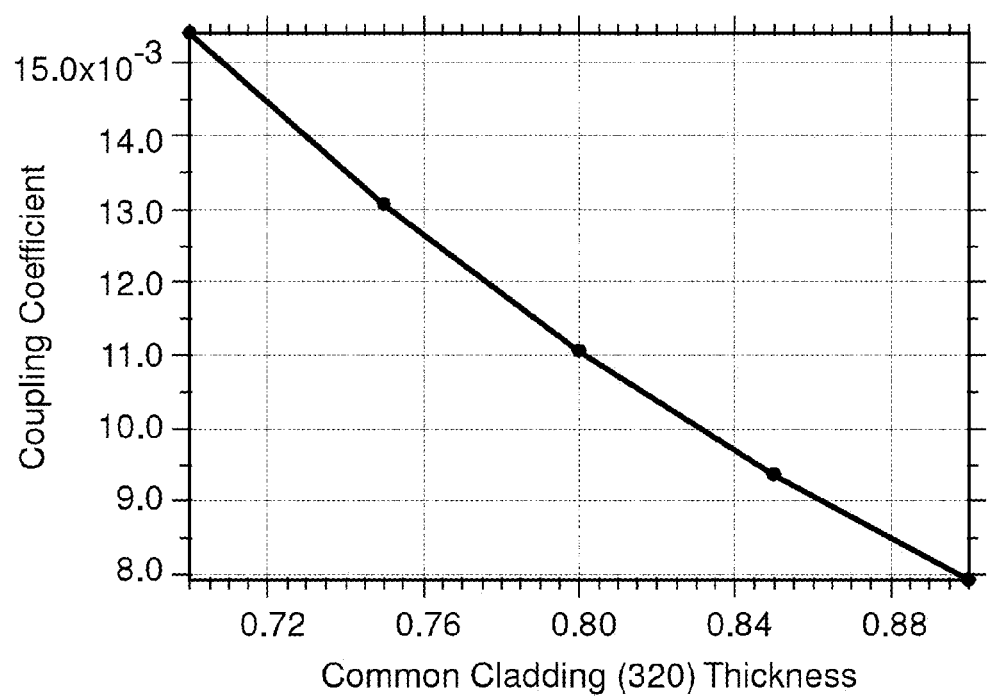
FIG. 14 illustrates the coupling coefficient as a function of the common cladding thickness.

Consequently, a 3 dB insertion loss is achieved by allowing $\kappa=\delta\beta/2=8\times10^{-3}$. The dependence of $\kappa$ on the common cladding 320 thickness is presented in FIG. 14. The coupling coefficient is evaluated using coupled mode theory, which agrees well with the supermode simulations shown in FIGS. 11 and 12. For the desired coupling coefficient $\kappa=\delta\beta/2=8\times10^{-3}$ a minimum common cladding 320 thickness of 900 nm is required to achieve a 3 dB insertion loss.

Figure 15:
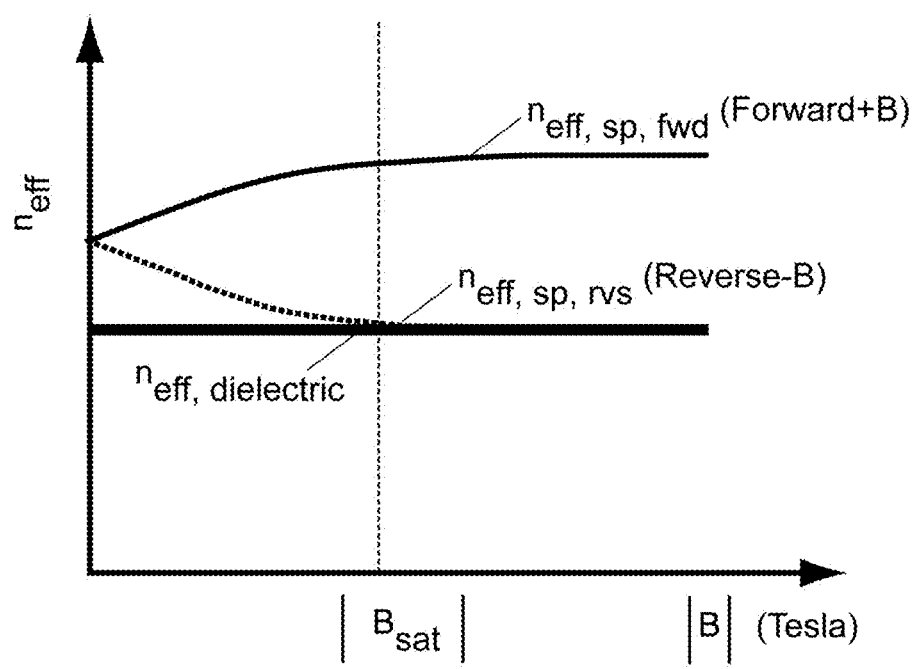
FIG. 15 illustrates the effective index of the surface plasmon waveguide as a function of magnetic field strength for an optimized optical isolator design.

As shown in FIG. 15, an optimized optical isolator can phase match in the reverse propagation direction with an applied saturated magnetic field $B_{sat}$ for the magnetic metal. Specifically, the effective index of the surface plasmon waveguide 400 equals that of the dielectric waveguide 200 for a saturated magnetic field strength $B_{sat}=0.17$ Tesla for iron. In the forward direction, the saturated magnetic field can produce the largest phase mismatch through the relationship $n_{eff,sp,fwd}-n_{eff,dielectric}=\delta\beta/k_0$.

Figure 16:
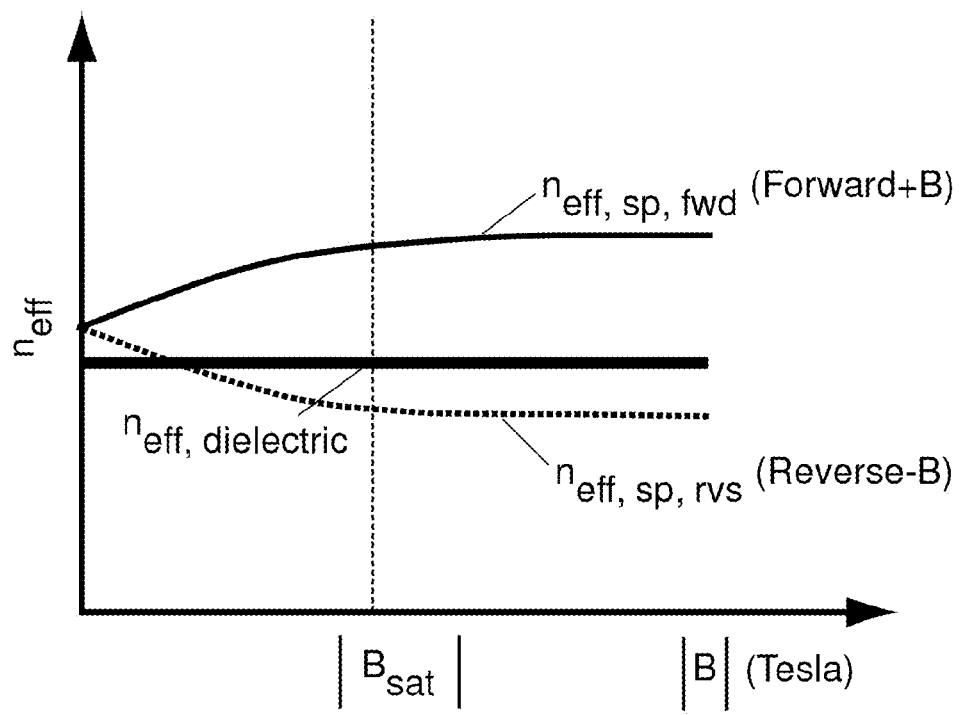
FIG. 16 illustrates the effective index of the surface plasmon waveguide as a function of magnetic field strength for a sub-optimal optical isolator design.

For a sub-optimal optical isolator design with the characteristic shown in FIG. 16, the surface plasmon effective index matches the effective index of the dielectric waveguide for an applied magnetic field strength less than $B_{sat}$. In the forward direction the phase-mismatch for a saturated magnetic field $n_{eff,sp,fwd}-n_{eff,dielectric}=\delta\beta/k_0-\Delta n$ is reduced by the phase-mismatch in the reverse direction $\Delta n=n_{eff,sp,rvs}-n_{eff,dielectric}$. To correct for the suboptimal device performance, the effective index of the dielectric waveguide 200 can be reduced or the effective index of the surface plasmon waveguide 400 mode can be increased.

The design procedure described in detail above produces an isolator with insertion loss less than 3 dB and isolation greater than 30 dB, resulting in isolator strength of approximately 500. The nominal dimensions of the various optical isolator components are as follows. The nominal device length can be about 50 µm and the nominal device width can be about 1.4 µm. The dielectric waveguide cladding 220 has a nominal thickness of approximately 1 µm, the dielectric waveguide core 240 has a nominal thickness of approximately 0.5 µm, the common cladding 320 has a nominal thickness of 0.9 µm, and the surface plasmon waveguide core 440 has a nominal thickness of 0.1 µm. The effective surface plasmon waveguide cladding 425 is the ambient atmosphere and can take any positive value.

Figure 17:
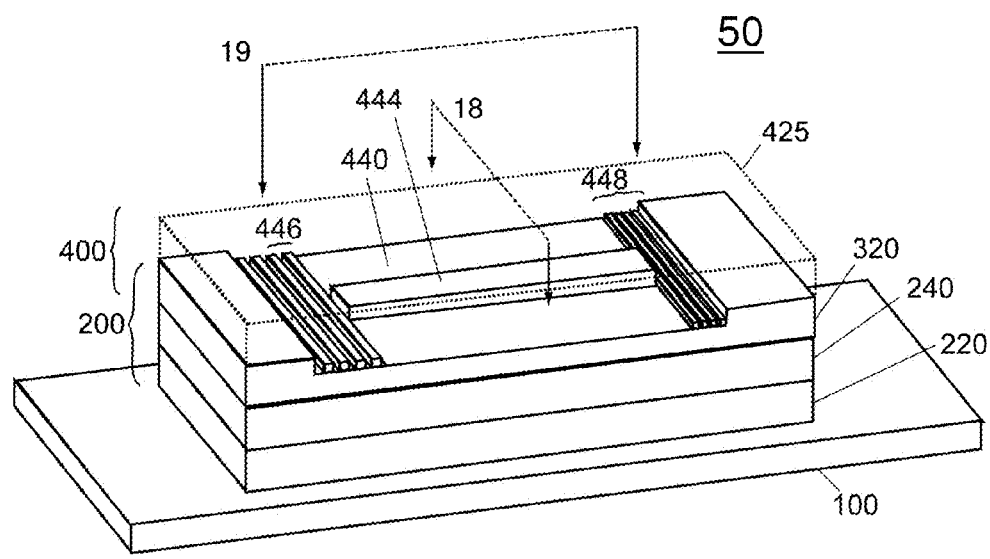
FIG. 17 is an isometric view of another embodiment a surface plasmon enhanced optical device designed for use as a frequency converter.
Figure 18:
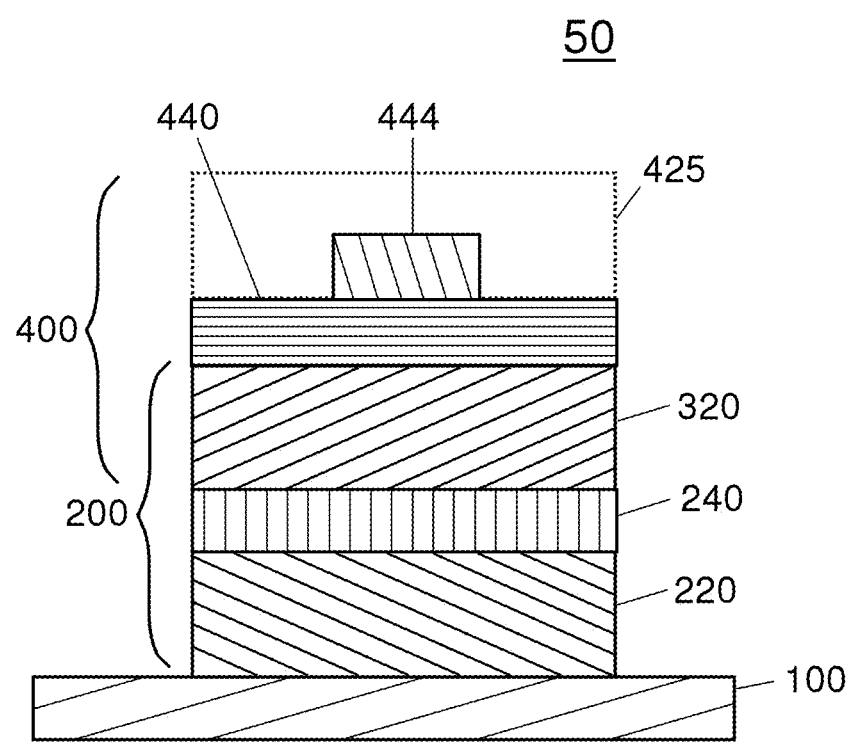
FIG. 18 is a cross-sectional view of the surface plasmon enhanced optical device designed depicted in FIG. 17.
Figure 19:
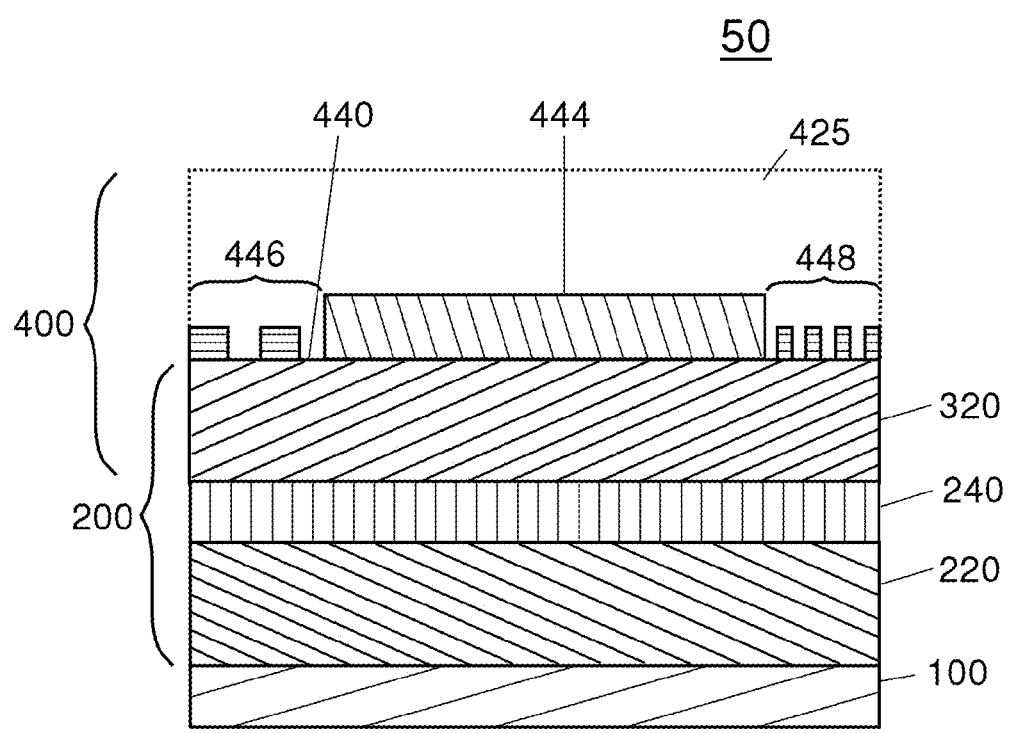
FIG. 19 is another cross-sectional view of the surface plasmon enhanced optical device designed depicted in FIG. 17.

FIG. 17 shows a frequency converter 50 for integrated photonics. FIG. 18 shows a lateral cross sectional view, and FIG. 19 shows a longitudinal cross sectional view of the frequency converter 50. The input dielectric waveguide 200 can be any dielectric material that exhibits nonlinear optical properties such as lithium niobate, KDP, BBO, LBO, lithium tantalate or like materials.

The surface plasmon waveguide core 440 includes a surface plasmon waveguide core ridge 444. A surface plasmon waveguide input grating 446 precedes the surface plasmon waveguide core 440 and a surface plasmon output grating 448 follows the surface plasmon waveguide core 440. As an example of frequency conversion, an optical wave at a fundamental input frequency $\omega$ is coupled into the surface plasmon waveguide 400 from an input dielectric waveguide 200 by the use of the surface plasmon input grating 446. In the surface plasmon mode, the phase velocities of the waves at the fundamental ($\omega$) and second harmonic ($2\omega$) frequencies are matched, so that efficient second harmonic generation occurs. By tailoring the height and width of the surface plasmon waveguide core ridge 444 on the surface plasmon waveguide core 440, the effective index of the surface plasmon waveguide 400 is designed to compensate for the material dispersion, thus achieving phase matching for the desired NLO process while suppressing parasitic NLO processes. The converted second harmonic is coupled back into the dielectric waveguide 200 using the surface plasmon waveguide output grating 448. A metal-ridge 444 formed on or from the surface plasmon waveguide core 440 results in the phase-matching geometry. The optical field intensities in the surface plasmon modes are much higher than those in traditional bulk and waveguide nonlinear optical devices, resulting in much higher conversion efficiencies and extremely short device lengths. The higher second harmonic frequency $2\omega$ (having the shorter wavelength) is confined to the ridge 440 while the lower fundamental frequency $\omega$ (having the longer wavelength) is guided by the waveguide core. This configuration allows the waveguide designer to adjust the waveguide core 440 and waveguide ridge 444 dimensions independently to match the nonlinear process. Coupling into and out of the surface plasmon waveguide from a dielectric waveguide can be accomplished using the grating techniques described here, or by other methods such as evanescent coupling. In addition, free space coupling can also be used to couple into and out of the surface plasmon waveguide using prisms (e.g., the Otto or Kretschmann configuration) or through the grating technique outlined here.

Different wavelengths can be generated in this way (including the important optical telecommunications wavelengths near 1550 nm) using different second-order nonlinear frequency conversion processes (including difference frequency generation, sum-frequency generation, and second harmonic generation). In addition, the phase-matching technique can be applied to third-order nonlinear interactions, including but not limited to four-wave mixing.

FIG. 20 illustrates the design procedure used for designing a nonlinear device. For any nonlinear interaction, conservation of momentum and energy must occur.

Step 1 (105), design the surface-plasmon waveguide for the fundamental wavelength, and evaluate the effective index of the surface-plasmon waveguide for the interacting wavelengths ($n_{eff}(\lambda_1)$, $n_{eff}(\lambda_2)$, $n_{eff}(\lambda_3)$) for a second order process or the interacting wavelengths ($n_{eff}(\lambda_1)$, $n_{eff}(\lambda_2)$, $n_{eff}(\lambda_3)$, $n_{eff}(\lambda_4)$) for a third order process.

Step 2 (106), add a metal ridge of height h, and width w, centered on the surface-plasmon waveguide metal core. Adjust the height h and the width w to phase match the nonlinear frequency conversion. For example, for second harmonic generation, the effective index of the combined structure must satisfy $n_{eff}(\lambda_1/2)=n_{eff}(\lambda_1)$.

Step 3 (107), design the input coupling section for the input wavelength(s), and the output coupling section for the frequency converted wavelength. Gratings or prisms can be used to couple in and out of the waveguides.

For example, for a second order process such as sum-frequency generation, phase matching requires conservation of momentum. This results in $k_3=k_2+k_1$, where $k_i=2\pi n_{eff}(\lambda_i)/$ $\lambda_i$, and i=1, 2, 3. For the special case of second harmonic generation $\lambda_1=\lambda_2$, and $\lambda_3=\lambda_1/2$, momentum conservation results in $n_{eff}(\lambda_1)=n_{eff}(\lambda_3)$. For the second harmonic generation case, the height h, and width w, of the surface-plasmon waveguide metal ridge 444 are adjusted to match the effective indices at $n_{eff}$ ($\lambda_1$) and $n_{eff}$ ($\lambda_3$) of the surface-plasmon waveguide. Since the smaller wavelength is mostly confined to the ridge, adjusting the ridge dimensions primarily influences the smaller wavelength. In general, the surface-plasmon metal ridge 444 and core 440 can be adjusted to match the effective indices $n_{eff}(\lambda_i)$ to satisfy the phase-matching constraint required to conserve momentum.

Figure 21:
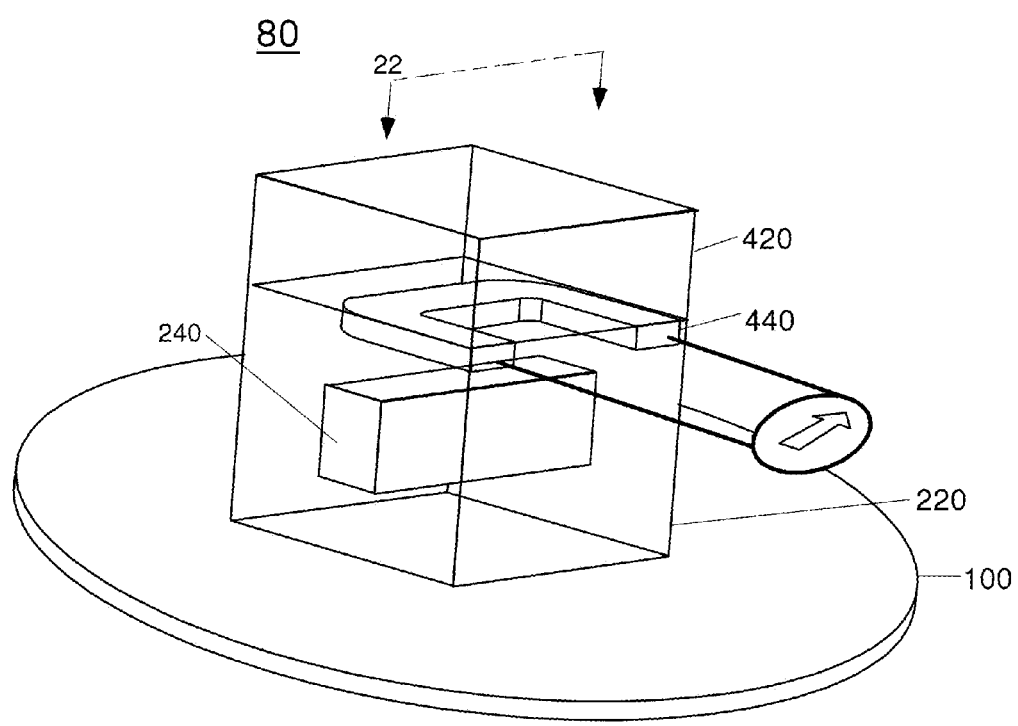
FIG. 21 is an isometric view of still another embodiment a surface plasmon enhanced optical device designed for use as an amplitude modulator.
Figure 22:
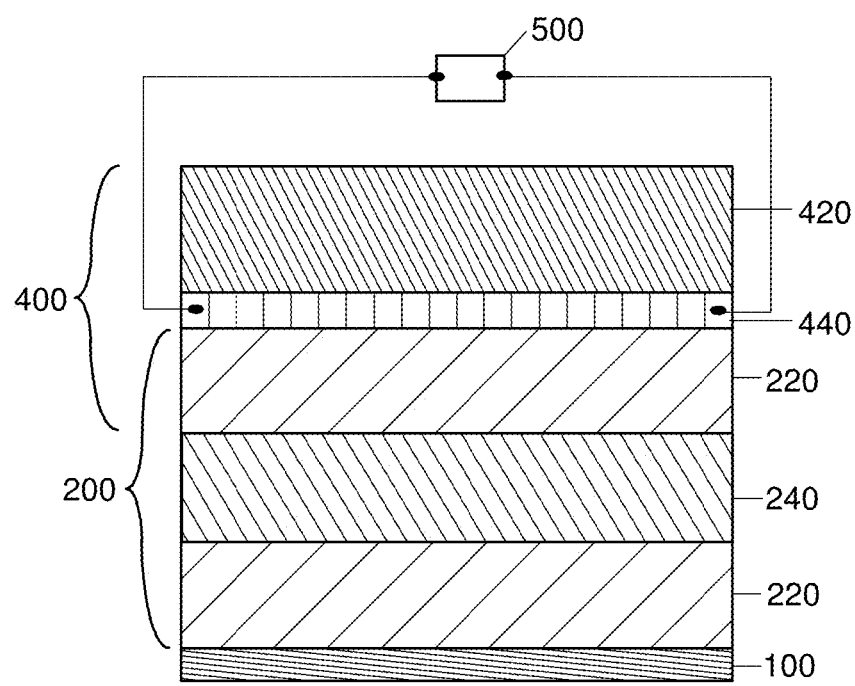
FIG. 22 is a cross-sectional view of the surface plasmon enhanced optical device designed depicted in FIG. 21.

FIGS. 21 and 22 show an amplitude modulator 80 for integrated photonics. The dielectric waveguide 200 can include a dielectric waveguide cladding 220 formed from $SiO_2$, a dielectric waveguide core 240 formed from silicon, a surface plasmon waveguide core 440 formed from a current-carrying metal such as gold, and a surface plasmon waveguide cladding 420 formed from a magneto-optic material such as $\gamma$-$Fe_2O_3$. A portion of the dielectric waveguide cladding 220 serves as the common cladding, although a separate layer of common cladding can be formed between the dielectric waveguide core 240 and the surface plasmon waveguide core 440. Although a silicon platform is described, other dielectric materials can be used.

A variable current source 500 is connected to the surface plasmon waveguide core 440 metal. The propagation constant of dielectric waveguide 200 is $\beta_1$ and the propagation of the surface plasmon waveguide 400 is $\beta_2$. Coupling occurs when these propagation constants are matched ($\beta_1=\beta_2$). Applying a current through the surface plasmon waveguide core 440 conductive metal changes the propagation constant, $\beta_2$ of the surface plasmon waveguide 400. The current generates a magnetic-field which interacts with the magneto-optic material of the surface plasmon waveguide cladding 420 to produce a change in the propagation constant of the surface plasmon waveguide 400. $\Delta\beta$ is the change in propagation constant induced by a magnetic field:

$$\beta_2=\beta_1+\Delta\beta \tag{19}$$

For a current applied in the reverse direction, the dielectric waveguide 200 and the surface plasmon waveguide 400 are phase-matched ($\beta_1=\beta_2$) resulting in power transfer from the dielectric waveguide 200 to the surface plasmon waveguide 400. When the current is applied in the forward direction, the induced magnetic field results in a phase-mismatch condition ($\beta_1-\beta_2=1.87\pi/L_c$), where poor coupling occurs between the dielectric waveguide 200 and the surface plasmon waveguide 400. $L_c$ is the coupling length for complete power transfer from dielectric waveguide to surface plasmon waveguide. The coupling length of the device is designed by choosing the appropriate spacing between the dielectric waveguide 200 and the surface plasmon waveguide 400 and is calculated using coupled mode theory.

Figure 23:
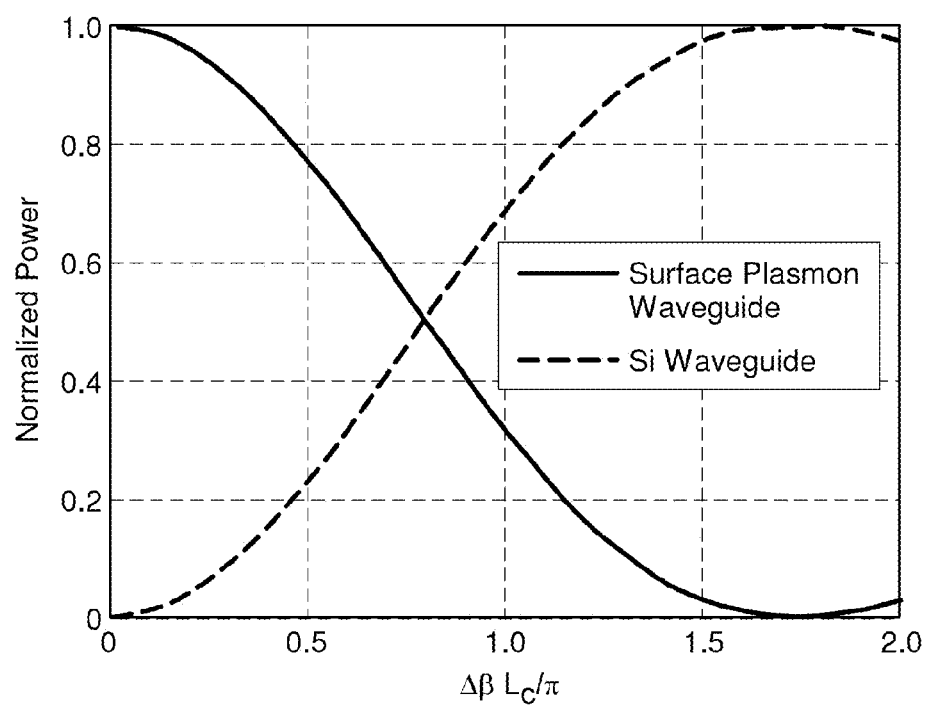
FIG. 23 illustrates the output of the dielectric waveguide and the power absorbed by the surface plasmon waveguide as a function of the propagation mismatch constant.

FIG. 23 displays the output of the dielectric waveguide 200 and the power absorbed by the surface plasmon waveguide 400 as a function of the propagation constant mismatch ($\Delta\beta=\beta_1-\beta_2$) between the surface plasmon waveguide 400 and the dielectric waveguide 200.

Figure 24:
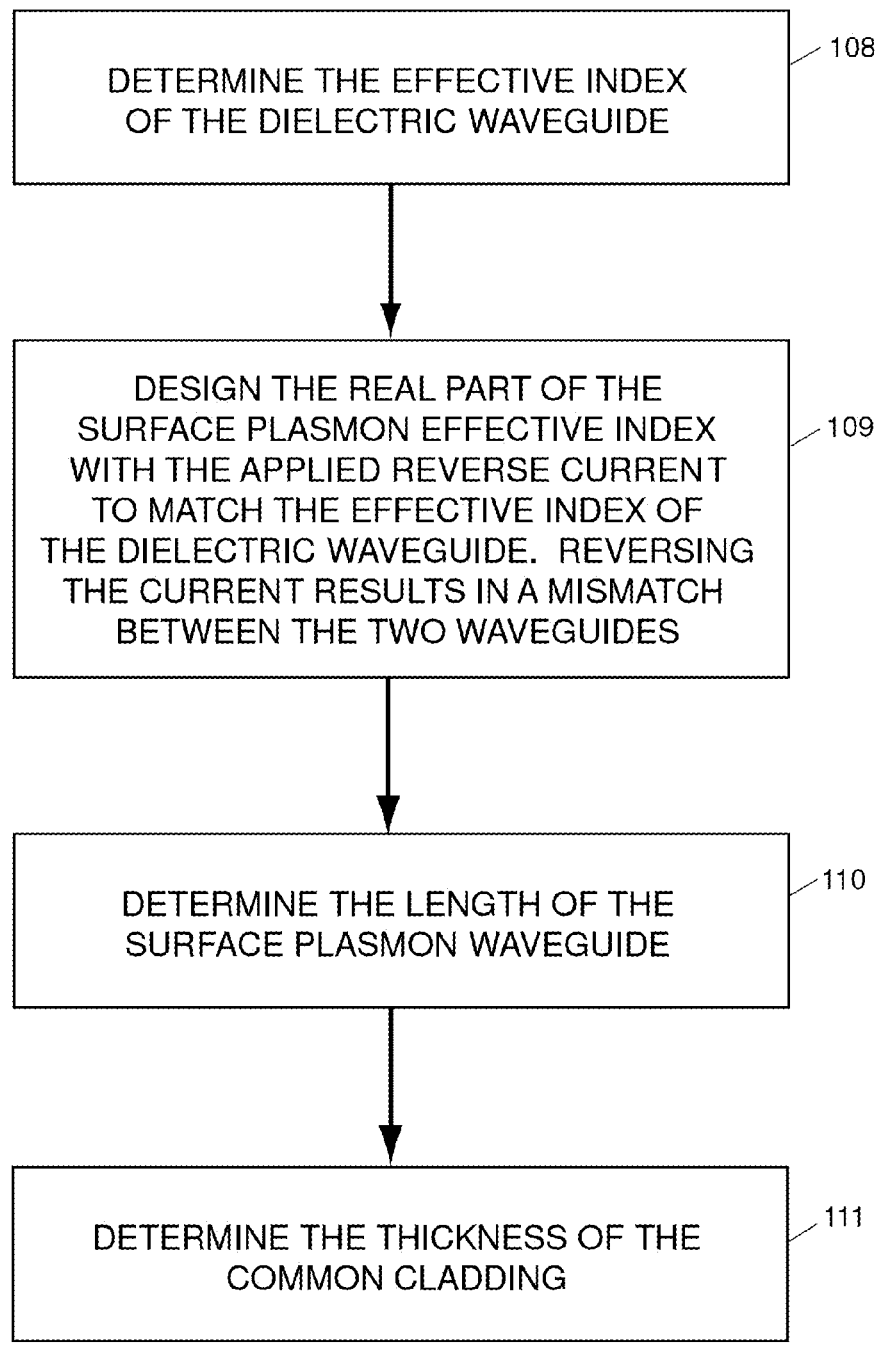
FIG. 24 is a design procedure for a surface plasmon enhanced optical device for an amplitude modulator.

FIG. 24 illustrates the design procedure used for designing an optical modulator.

Step 1 (108), determine the effective index of the dielectric waveguide.

Step 2 (109), design the real part of the surface plasmon effective index with the applied reverse current to match the effective index of the dielectric waveguide, reversing the current results in a mismatch between the two waveguides.

Step 3 (110), determine the length of the surface plasmon waveguide.

Step 4 (111), determine the thickness of the common cladding.

The design methodology is similar to that used in the optical isolator. The main difference is that the low insertion loss is achieved for a reverse direction of the applied current, while the attenuation is achieved for a forward direction of the applied current. The modulator can be designed for any two values of applied current ($I_1$, $I_2$). For a maximum current $I_{max}$, the largest phase-mismatch can occur for $I_1=-I_2=I_{max}$. Designing the isolator for this detuning can result in a smaller device.

The disclosed modulator embodiment can be implemented in materials commonly used in the photonics and semiconductor industries. Another advantage of the disclosed modulator embodiment is the short length required for efficient modulation. For example, the device length required in the $Si/SiO_2$ material system is approximately 100 µm, which is at least an order of magnitude smaller than the approximately 1 to 10 mm lengths of commercially available modulators used in bulk optics applications. Since the magneto-optic change in propagation constant ($\Delta\beta$) is proportional to the field confinement, the confinement of the surface plasmon waveguide 400 can be further increased using different metal geometries such as the channel, thereby allowing for an additional order of magnitude decrease in size.

Figure 25:
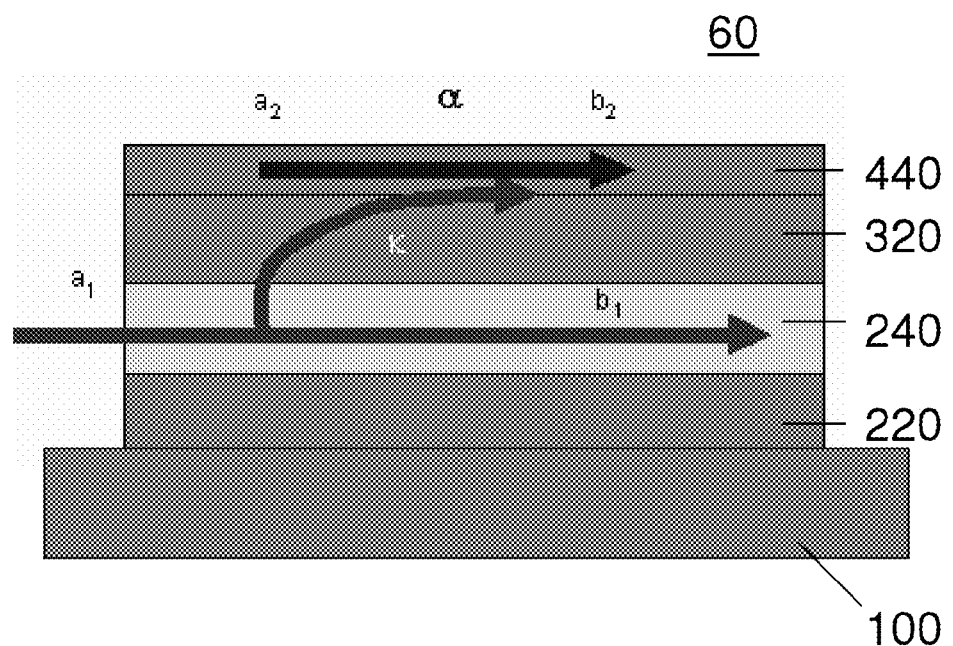
FIG. 25 shows coupling into a lossy surface-plasmon mode for a low-loss dielectric waveguide.

FIG. 25 shows coupling into a lossy surface-plasmon mode for a low-loss dielectric waveguide in a surface plasmon enhanced optical device 60. The coupling rate is denoted by $\kappa$, while the loss is denoted by $\alpha$. The transmission of the dielectric waveguide is given by the ratio, $$T_1 = \frac{|b_1|^2}{|a_1|^2}. \tag{20}$$

For efficient coupling to occur, the dielectric waveguide and surface-plasmon waveguide are phase-matched. In addition, the surface-plasmon mode and the dielectric waveguide mode constructively interfere over the coupling length of the device. For interference to occur, the amplitudes must be the same or substantially the same. Since the surface-plasmon mode has a loss rate denoted by $\alpha$, the coupling rate $\kappa$ equals the rate of loss (i.e., $\kappa=\alpha$). Physically, this corresponds to the condition in which the transmissivity in both waveguides are equal, $$t_1 = \frac{b_1}{a_1} = t_2 = \frac{b_2}{a_2}. \tag{21}$$

FIG. 26 shows a surface plasmon enhanced optical device 70 including a multilayer surface plasmon waveguide core 440'. The core 440' includes a first layer 460 and a second layer 470. In this exemplary embodiment, the first layer 460 is the non magneto-optic material (e.g., gold), and the second layer 470 is the magneto-optic material (e.g., iron). The multilayer metal can lower the loss of the surface-plasmon mode. FIG. 26 also includes exemplary dimensions where the substrate 100 is formed from InP having a refractive index of 3.1695, the waveguide cladding 220 is formed from InP, the dielectric waveguide core 240 is formed from InGaAsP having a refractive index of 3.5, the common cladding 320 is formed from InP, and the effective surface plasmon cladding 425 is ambient air.

Gold has a large ratio of the real to imaginary permittivity ($\in_m = -93+11i$) indicating less ohmic loss in the surface-plasmon mode. Iron has a large nonreciprocity at the expense of a large loss (refractive index n=3.65+5.6i). The metal thicknesses can be selected to obtain a large nonreciprocity while decreasing the loss of the surface-plasmon mode and to phase-match the surface-plasmon mode to the dielectric waveguide. For large separations between the waveguides, the imaginary index of the surface-plasmon mode is $n_i \sim 0.1$, which is a factor of three smaller than the case of an iron surface-plasmon mode without the use of the multilayer metal.

The use of a multilayer surface plasmon waveguide core 440' permits the two waveguides to be brought into close proximity, e.g., decreasing the common cladding thickness increases the coupling rate κ. FIG. 27 illustrates the presence of the two supermodes (absolute value), indicating coupling between the plasmon mode and the dielectric waveguide for a common cladding thickness of 350 nm. The imaginary indices of the two supermodes meet each other at this common cladding thickness. Both of the imaginary indices are at one half of the value of the uncoupled surface-plasmon mode. This indicates that the surface-plasmon supermode has become less lossy, while the dielectric waveguide supermode has increased its loss as the separation between the waveguides is decreased. This condition in which the imaginary indices are matched corresponds to the critical coupling condition in which both supermodes provide good interference and efficient coupling.

To simulate the mode propagation between the two supermodes, a complex superposition of the supermodes can be constructed. For example, the total magnetic field $H_y$ consists of $H_y = c_1 H_{s1} e^{-j\beta_1 z} + c_2 H_{s2} e^{-j\beta_2 z}$, where $c_1$ and $c_2$ are the complex superposition coefficients to be determined, and $H_{s1}$ and $H_{s2}$ are the two supermode amplitudes. The propagation constants $\beta_1$ and $\beta_2$ are related to the effective indices by $\beta i = n_{\mathit{eff}i} k_0$, where $k_0 = 2\pi/\lambda$, and $i=[1,2]$ for supermode 1 and 2, respectively. The complex superposition coefficients $c_1$ and $c_2$ are determined by the boundary condition. $c_1$, $c_2$ and the coordinate system are selected so that the power is concentrated in the dielectric waveguide at z=0. The boundary condition is satisfied as the mode begins in the dielectric waveguide. As the propagation distance is increased, the power in the dielectric waveguide is transferred into the surface-plasmon waveguide. By using a multilayer surface plasmon waveguide core, the loss of the plasmon mode can be decreased by a factor of three (as compared with a single layer).

FIG. 28 shows a fabrication process for a surface plasmon enhanced optical device 80. For example, device 80 can be a surface plasmon isolator waveguide. Deposition (e.g., metalorganic chemical vapor deposition), growth and lithographic techniques can be used to form device 80. In FIG. 28A, a sample 90 is formed using metalorganic chemical vapor deposition. The sample 90 includes a layer for the dielectric waveguide core 240 (e.g., InGaAsP) disposed on a base 550 (e.g., InP) and a layer for the common cladding 320 disposed on dielectric waveguide core layer 240. In FIG. 28B, a material 560 is deposited on the common cladding layer 320. The material 560 (e.g., a metal) can serve as an etch mask which defines the dielectric waveguide while also serving as the surface plasmon waveguide core 440. In FIG. 28C, a mask 570 is disposed on material 560. In FIG. 28D, the metals have been wet etched. In FIG. 28E, device 80 has been formed using a reactive ion etch (e.g., methane or $CF_4$). Base 550 is developed into substrate 100 and dielectric waveguide cladding 220.

Although various aspects of the disclosed method have been shown and described, modifications may occur to those skilled in the art upon reading the specification. The present application includes such modifications and is limited only by the scope of the claims.

What is claimed is:

1. An optical device for integrated photonic applications, comprising:
   a substrate;
   a dielectric waveguide disposed on the substrate, the dielectric waveguide comprising a dielectric waveguide core disposed between a dielectric waveguide cladding and a common cladding; and
   a surface plasmon waveguide disposed relative to the dielectric waveguide, the surface plasmon waveguide comprising a surface plasmon waveguide core disposed relative to the common cladding and a surface plasmon waveguide cladding, the common cladding configured to couple the dielectric waveguide and the surface plasmon waveguide,
   wherein optical properties of the dielectric waveguide cladding are different from optical properties of the common cladding; and
   wherein the effective index of the surface plasmon waveguide is adapted to be non-reciprocal when receiving a magnetic field in a direction transverse to propagation.

2. The optical device of claim 1 wherein the surface plasmon waveguide cladding comprises a magneto-optic material.

3. The optical device of claim 1 wherein the surface plasmon waveguide core comprises a non magneto-optic material.

4. The optical device of claim 1 wherein the surface plasmon waveguide core comprises a first layer of a non magneto-optic material disposed on the common cladding and a second layer of a magneto-optic material disposed on the first layer.

5. The optical device of claim 1 wherein the surface plasmon waveguide cladding is an effective cladding layer defined by ambient air.

6. The optical device of claim 5 wherein the surface plasmon waveguide core defines a ridge formed on a surface of the common cladding.

7. The optical device of claim 5 further comprising a first grating formed on the surface of the common cladding at a first end of the ridge and a second grating formed on the surface of the common cladding at a second end of the ridge.

8. The optical device of claim 1 wherein the optical device comprises an optical isolator.

9. The optical device of claim 1 further comprising a current source adapted to be in electrical communication with the surface plasmon waveguide core.

10. The optical device of claim 1 wherein the optical device comprises an amplitude modulator, frequency modulator, splitter, combiner, or coupler.

11. A method for fabricating an optical device for integrated photonic applications, comprising:
    disposing, on a substrate, a dielectric waveguide including a dielectric waveguide core disposed between a dielectric waveguide cladding and a common cladding; and
    disposing, on the dielectric waveguide, a surface plasmon waveguide including a surface plasmon waveguide core disposed between the common cladding and a surface plasmon waveguide cladding, the dielectric waveguide and the surface plasmon waveguide sharing the common cladding, the dielectric waveguide and the surface plasmon waveguide being coupled, wherein optical properties of the dielectric waveguide cladding are different from optical properties of the common cladding, and wherein the effective index of the surface plasmon waveguide is adapted to be non-reciprocal when receiving a magnetic field in a direction transverse to propagation.

12. The method of claim 11 further comprising forming the surface plasmon waveguide core by disposing a first layer of a non magneto-optic material on the common cladding and disposing a second layer of a magneto-optic material on the first layer.

13. A method of operating an optical device for integrated photonic applications, comprising:
coupling a dielectric waveguide and a surface plasmon waveguide;
applying a magnetic field in a direction transverse to propagation to cause the effective index of the surface plasmon waveguide to be non-reciprocal.

14. The method of claim 13 wherein the surface plasmon waveguide comprises a surface plasmon waveguide core including (i) a first layer of a non magneto-optic material disposed on a common cladding of the dielectric waveguide and the surface plasmon waveguide and (ii) a second layer of a magneto-optic material disposed on the first layer.

15. An optical device for integrated photonic applications, comprising:
a substrate;
a dielectric waveguide disposed on the substrate, the dielectric waveguide comprising a dielectric waveguide core disposed between a dielectric waveguide cladding and a common cladding; and
a surface plasmon waveguide disposed relative to the dielectric waveguide, the surface plasmon waveguide comprising a surface plasmon waveguide core disposed relative to the common cladding and a surface plasmon waveguide cladding, the common cladding configured to couple the dielectric waveguide and the surface plasmon waveguide,
wherein optical properties of the dielectric waveguide cladding are different from optical properties of the common cladding; and
wherein the optical device comprises an optical isolator.

* * * * *